US008649999B1

(12) United States Patent
Sheng et al.

(10) Patent No.: US 8,649,999 B1
(45) Date of Patent: Feb. 11, 2014

(54) METHODS, DEVICES AND SYSTEMS FOR DETERMINING THE ZERO RATE OUTPUT OF A SENSOR

(75) Inventors: Hua Sheng, Clarksburg, MD (US); Bryan A. Cook, Silver Spring, MD (US); Matthew G. Liberty, Gaithersburg, MD (US)

(73) Assignee: Hillcrest Laboratories, Inc., Rockville, MD (US)

( * ) Notice: Subject to any disclaimer, the term of this patent is extended or adjusted under 35 U.S.C. 154(b) by 180 days.

(21) Appl. No.: 12/978,956

(22) Filed: Dec. 27, 2010

Related U.S. Application Data

(60) Provisional application No. 61/290,358, filed on Dec. 28, 2009.

(51) Int. Cl.
*G01P 5/00* (2006.01)

(52) U.S. Cl.
USPC .............................. 702/141; 702/87; 702/104

(58) Field of Classification Search
USPC ...................... 702/87, 92, 104, 141, 150, 151
See application file for complete search history.

(56) References Cited

U.S. PATENT DOCUMENTS

| 7,158,118 | B2 | 1/2007 | Liberty | |
|---|---|---|---|---|
| 7,860,676 | B2 | 12/2010 | Sheng et al. | |
| 2004/0268393 | A1 | 12/2004 | Hunleth et al. | |
| 2006/0262116 | A1 | 11/2006 | Moshiri et al. | |
| 2007/0035518 | A1 | 2/2007 | Francz et al. | |
| 2007/0106423 | A1* | 5/2007 | Myeong et al. | 700/245 |
| 2009/0234587 | A1* | 9/2009 | Hsiung et al. | 702/22 |
| 2010/0174506 | A1* | 7/2010 | Joseph et al. | 702/141 |

* cited by examiner

*Primary Examiner* — Marc Armand
*Assistant Examiner* — Ivan Rabovianski
(74) *Attorney, Agent, or Firm* — Patent Portfolio Builders PLLC

(57) ABSTRACT

A bias value associated with a sensor, e.g., a time-varying, non-zero value which is output from a sensor when it is motionless, is estimated using a ZRO-tracking filter which is a combination of a moving-average filter and a Kalman filter having at least one constraint enforced against at least one operating parameter of the Kalman filter. It achieves faster convergence on an estimated bias value and produces less estimate error after convergence. A resultant bias estimate may then be used to compensate the biased output of the sensor in, e.g., a 3D pointing device.

24 Claims, 12 Drawing Sheets

METHODS, DEVICES AND SYSTEMS FOR DETERMINING THE ZERO RATE OUTPUT OF A SENSOR

RELATED APPLICATION

This application is related to, and claims priority from, U.S. Provisional Patent Application Ser. No. 61/290,358, filed on Dec. 28, 2009, entitled "A Method for Determining the Zero Rate Output of a Sensor", the disclosure of which is incorporated here by reference.

BACKGROUND

The present invention describes bias tracking techniques, systems, software and devices, which can be used in 3D pointing devices, as well as in other types of devices.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily by cable TV operators and in hotels, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides and their on-screen equipvalent are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications and systems. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices. The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device and another device, e.g., which generates a user interface, may be performed wirelessly or via a wire connecting the 3D pointing device that device. Thus "3D pointing" differs from, e.g., conventional computer mouse pointing techniques which use a surface, e.g., a desk surface or mousepad, as a proxy surface from which relative movement of the mouse is translated into cursor movement on the computer display screen. An example of a 3D pointing device can be found in U.S. Pat. No. 7,158,118 to Matthew G. Liberty (hereafter referred to as the '118 patent), the disclosure of which is incorporated here by reference.

The '518 patent describes 3D pointing devices which include, for example, one or two rotational sensors and an accelerometer. The rotational sensor(s) are used, as described in more detail below, to detect an angular rate at which the 3D pointing device is being rotated by a user. However, the output of the rotational sensor(s) does not perfectly represent the angular rate at which the 3D pointing device is being rotated due to, for example, bias (also sometimes referred to as "offset") in the sensor(s)' outputs. For example, when the 3D pointing device is motionless, the rotational sensor(s) will typically have a non-zero output due to their bias. If, for example, the 3D pointing device is used as an input to a user interface, e.g., to move a cursor, this will have the undesirable effect of cursor drifting across the screen when the user intends for the cursor to remain stationary. Thus, in order to provide a 3D pointing device which accurately reflects the user's intended movement, estimating and removing bias from sensor output is highly desirable. Moreover other devices, in addition to 3D pointing devices, may benefit from being able to estimate and compensate for the bias of inertial sensors. Making this process more challenging is the fact that the bias is different from sensor to sensor and, even for individual sensors, is time-varying, e.g., due to changes in temperature.

Accordingly, there is still room for improvement in the area of bias estimation and handheld device design, generally, and 3D pointer design, more specifically.

SUMMARY

According to exemplary embodiments, an adaptive ZRO (Zero-Rate Output)-tracking filter for an angular rate sensor uses the shared recursive computation architecture of the standard Kalman filter, a cumulative moving-average filter, and an exponential moving-average filter, but the gain is adaptively modified as the mixed function of Kalman gain, cumulative moving-average coefficient, and exponential moving-average coefficient. Constraints are enforced on the predicted estimate covariance used in the Kalman gain computation to revise the gain accordingly. Such mixed functions and constraints can vary over time, particularly as a function of the ZRO estimate convergence. Such exemplary embodiments combine both advantages taken from an averaging filter and an unconstraint Kalman filter, provide quicker convergence to the true ZRO value even during motion of the device, and produce almost no backlash after convergence. Exemplary embodiments are also capable of distinguishing between constant-speed human motion of the device and a device which is stationary, i.e., without intended motion but with a non-zero output due to sensor bias.

According to one exemplary embodiment, a device includes: at least one sensor configured to sense rotation of the device about a first axis and to generate at least one first output associated therewith, and a ZRO filter configured to receive the at least one first output and to compensate the at least one first output for a bias associated with the at least one sensor, wherein the ZRO filter is implemented in a Kalman filter form having at least one dynamic constraint enforced on at least one parameter associated therewith.

According to another exemplary embodiment, a device includes at least one sensor configured to sense rotation of the device about a first axis and to generate at least one first output associated therewith, and a ZRO filter configured to receive the at least one first output and to compensate the at least one first output for a bias associated with the at least one sensor, wherein the ZRO filter is implemented as an adaptive combination of a Kalman filter and a moving average filter.

BRIEF DESCRIPTION OF THE DRAWINGS

The accompanying drawings illustrate exemplary embodiments, wherein.

Figure 1:
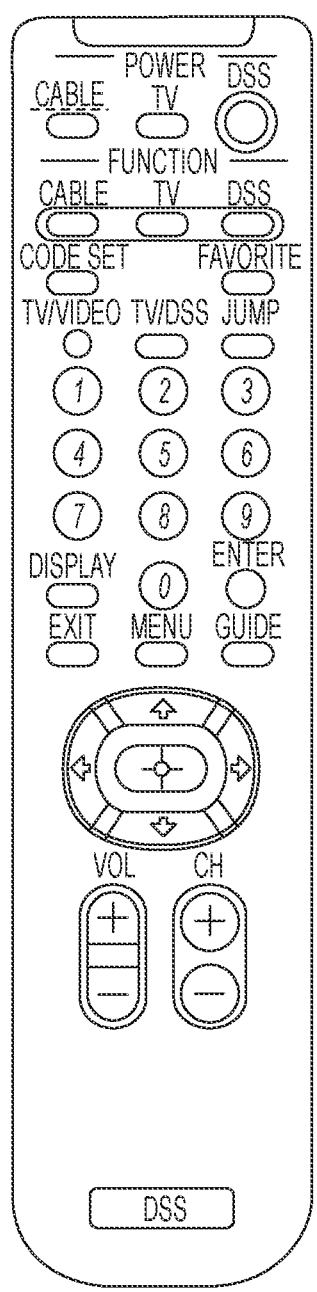
FIG. 1 depicts a conventional remote control unit for an entertainment system.

| Denotation | Unit | Description |
| --- | --- | --- |
| | | SYMBOL LISTING |
| ZRO | rad/s | Zero-rate output of angular velocity sensor |
| $x_n$ | | The variable x at time step n |
| Q | $(rad/s)^2$ | Process uncertainty variance |
| X | rad/s | True ZRO |
| $\bar{X}$ | rad/s | ZRO estimate of moving-average filter |
| $\hat{X}$ | rad/s | ZRO estimate of ZRO-tracking filter |
| $\hat{X}^-$ | rad/s | ZRO estimate before measurement |
| P | $(rad/s)^2$ | The error variance of $\hat{X}$ |
| $P^-$ | $(rad/s)^2$ | The error variance of $\hat{X}^-$ |
| M | rad/s | The measurement of X |
| RS | rad/s | The output of angular velocity sensor and the input of ZRO-tracking filter |
| $\omega$ | rad/s | The true angular velocity along the sensing axis |
| $\epsilon_\omega$ | rad/s | The angular velocity sensor output error of $\omega$ when $\omega \neq 0$ (calibrated domain) |
| $\zeta_\omega$ | rad/s | Nonlinearity error part of $\epsilon_\omega$ |

-continued

SYMBOL LISTING

| Denotation | Unit | Description |
|---|---|---|
| α | | Coefficient of linear error part of $\epsilon_\omega$ |
| η | rad/s | Angular velocity sensor noise |
| σ | rad/s | Standard deviation of angular velocity sensor noises |
| R | $(rad/s)^2$ | Error variance of M |
| $S_n$ | $(rad/s)^2$ | Sum of $P_n^-$ and $R_n$ |
| $k_n$ | | Coefficient of the ZRO-tracking filter at time step n |
| $k^{kalman}$ | | Kalman Gain |
| $k^{MA}$ | | Coefficient of moving-average filter |
| $K^{EMA}$ | | Constant coefficient of exponential moving-average filter |
| $k^{MMA}$ | | Coefficient of mixed moving-average filter |
| M | samples | Number of samples used in moving-average filter |
| $F_s$ | Hz | Sampling frequency |
| ΔX | (rad/s) | True-ZRO change in given elapsed time Δt |
| Δt | second | Elapsed time needed for ΔX to be non negligible |
| $Tot_{\tilde{X}}$ | (rad/s) | The maximum tolerable error on $\tilde{X}$ for any n by design |
| $Tol_{\tilde{X}}$ | (rad/s) | The maximum tolerable error on $\hat{X}_n$ for any n by design |
| $\psi_{max}$ | rad | The max angular displacement for human motion |
| $\psi_{min}$ | rad | The min angular displacement for human motion |
| Ψ | rad | Maximum angle range which user could swing limited by elbow/wrist/upper arm: $\Psi = |\psi_{max} - \psi_{min}|$ |
| $\epsilon_{\tilde{x}^n}$ | rad/s | Error on $\tilde{X}_n$ comparing with $X_n$ |
| $\Delta\psi_n$ | rad | Angle displacement moved from sample #1 to sample #n |
| $t_n$ | second | Time elapsed when sample n arrives: $t_n = \frac{n}{FS}$ |
| ξ | rad/s | Combination of averaged nonlinear error and averaged ZRO change from sample 1 to sample n |
| LP | $(rad/s)^2$ | The lower bound of $P_n^-$ |
| UP | $(rad/s)^2$ | The upper bound of $P_n^-$ |
| ε | rad/s | Error |
| E[*] | | Expectation of * |
| $T_{bound}$ | second | Elapsed time for the longest motion moved from one angular position to another, and back to almost the same |
| $T_{stableTime}$ | second | The time duration used for evaluating converge confidence |
| $T_{stationary}$ | second | The time duration when the device is not in intended motion |
| $T_{constMotion}$ | second | Time duration of attempted constant-speed angular velocity driven by human hand |
| N | samples | $N = [T_{stableTime} \cdot F_s]$, # of samples corresponding to $T_{stableTime}$ |
| j | | Index of angular velocity sensor channels: currently only 2, 1 -> Y, 2 -> Z |
| CCF | | Converging confidence measurement of ZRO estimate: integer factor |
| Var(*) | $(rad/s)^2$ | Variance of * |
| $\sigma^2$ | $(rad/s)^2$ | Variance |
| tremor (subscripted) | $(rad/s)^2$ | Human-hand angular velocity tremor signal |
| motion (subscripted) | $(rad/s)^2$ | Human-hand intended angular velocity motion signal |
| Pr | | Probability |
| fa (subscripted) | | False alarm |
| td (subscripted) | | Target detection |
| Rate($Pr_{fa}$, N) | | False-alarm detection rate of continuous N samples double channel per $T_{constMotion}$ second |
| $Rate_0$ | | The highest allowed false alarm rate of Rate($P_{fa}$,N) by design |
| Rate($Pr_{td}$, N) | | Target detection rate of continuous N samples double channel per $T_{stationary}$ second |
| $Rate_1$ | | The minimum desired target detection rate of Rate($P_{td}$, N) by design |
| $T_{shortStableTime}$ | second | The short time duration used for evaluating converge confidence |
| $T_{middleStableTime}$ | second | The middle-long time duration used for evaluating converge confidence |
| $T_{longStableTime}$ | second | The long time duration used for evaluating converge confidence |

-continued

SYMBOL LISTING

| Denotation | Unit | Description |
|---|---|---|
| L | Sample | Buffer size for $R_{s_{In}}$ variance estimate |
| $T_{buffer}$ | Second | Buffer time for $R_{s_{In}}$ variance estimate $T_{buffer} = L/F_s$ |
| $T_{tremor}$ | Second | Human hand tremor period |
| $f_{tremor}$ | Hz | Human hand tremor frequency |
| $T_{stopForClick}$ | Second | Most frequently used time for stop-to-click for most users |
| p2p(*) | rad/s | The peak to peak value of * |
| β | | Measurement confidence factor: a constant coefficient |
| $K_1$ | | Minimum Kalman gain before convergence |
| $K_2$ | | Maximum Kalman gain after convergence |
| $K_3$ | | Some constant filter gain where to ensure not fast enough to track slow motion |
| $K_4$ | | Some constant filter gain where to ensure fast enough to track $X_n$ |
| motion * | | The intended motion which has speed faster than $Tol_{\tilde{X}}$ |
| $R_{max}$ | $(rad/s)^2$ | The definition of fast motion in determine whether no Q is ok |
| $\sigma_{smallDyn}$ | $(rad/s)^2$ | The definition of slow motion in determine whether no Q is ok |
| $R_{motionDyn}^{acc}$ | $(m/s2)^2$ | The definition of slow motion in determine whether no Q is ok |
| $R^{acc}$ | $(m/s2)^2$ | Dynamics measurement of linear accelerometer data |
| C | | Constant |
| Tol | | Tolerance of error |

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
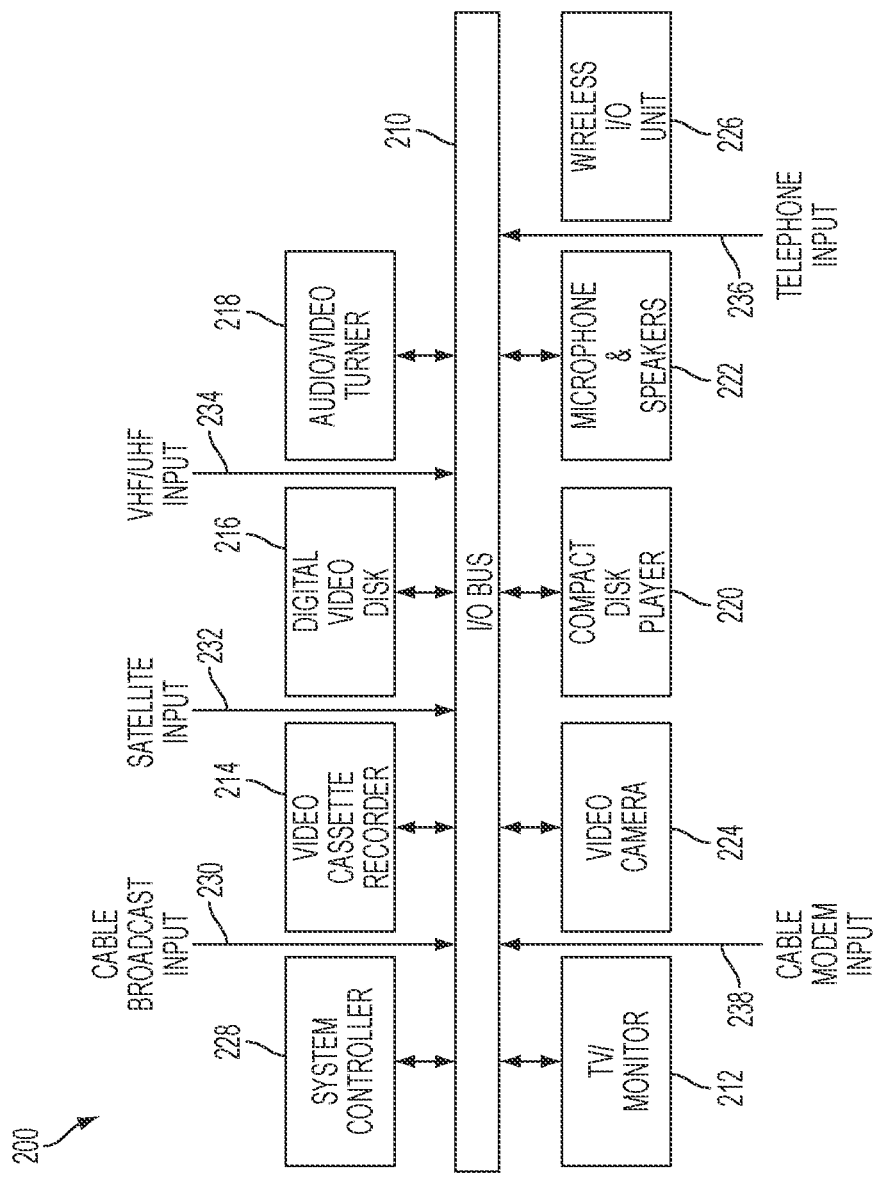
FIG. 2 depicts an exemplary media system in which exemplary embodiments can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. Patent Application "A Control Framework with a Zoomable Graphical User Interface for Organizing, Selecting and Launching Media Items". Alternatively, remote devices in accordance with the present invention can be used in conjunction with other systems, for example computer systems including, e.g., a display, a processor and a memory system or with various other systems and applications.

Figure 3:
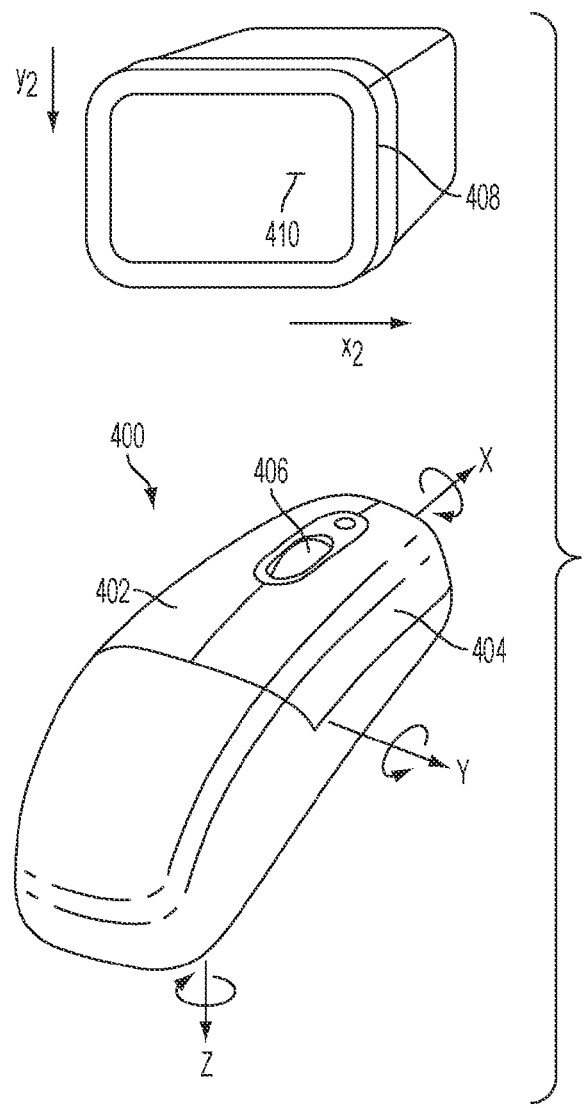
FIG. 3 shows a 3D pointing device in which exemplary embodiments can be implemented.

As mentioned in the Background section, remote devices which operate as 3D pointers are of particular interest for the present specification. Such devices enable the translation of movement, e.g., gestures or pointing, into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some exemplary embodiments of the present invention can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406, although other exemplary embodiments will include other physical configurations. According to exemplary embodiments of the present invention, it is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the $y_2$ axis of the display 408. Likewise, rotation of the 3D pointing device 408 about the z-axis can be sensed by the 3D pointing device 400 and translated into an output usable by the system to move cursor 410 along the $x_2$ axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
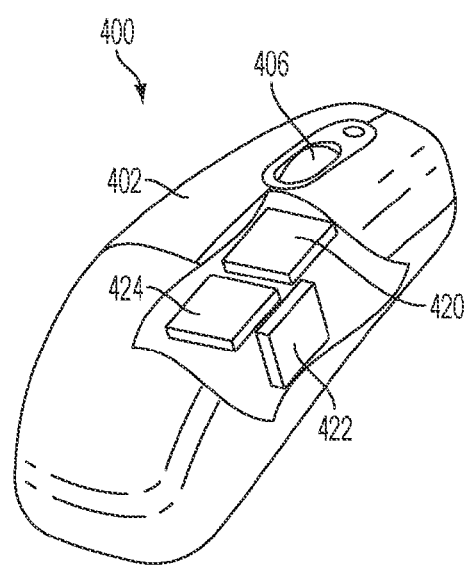
FIG. 4 illustrates a cutaway view of the 3D pointing device in FIG. 4 including two rotational sensors and one accelerometer.

According to one purely illustrative exemplary embodiment of the present invention, two rotational sensors 420 and 422 and one accelerometer 424 can be employed as sensors in 3D pointing device 400 as shown in FIG. 4. Although this exemplary embodiment employs inertial sensors it will be appreciated that the present invention is not so limited and examples of other types of sensors which can be used in conjunction with other exemplary embodiments are provided below. The rotational sensors 420 and 422 can, for example, be implemented using ADXRS150 or ADXRS401 sensors made by Analog Devices. It will be appreciated by those skilled in the art that other types of rotational sensors can be employed as rotational sensors 420 and 422 and that the ADXRS150 and ADXRS401 are purely used as an illustrative example.

Unlike traditional gyroscopes, these exemplary rotational sensors use MEMS technology. A 1-axis MEMS Coriolis vibratory gyroscopes provides a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors 420 and 422 have a single sensing axis (as for example the ADXRS150s), then they can be mounted in the 3D pointing device 400 such that their sensing axes are aligned with the rotations to be measured. For an exemplary embodiment of the present invention, this means that rotational sensor 422 is mounted such that its sensing axis is parallel to the y-axis and that rotational sensor 420 is mounted such that its sensing axis is parallel to the z-axis as shown in FIG. 4.

It will be appreciated that different sensor packages may be available which could lead to other exemplary implementations. For example, the two 1-D rotational sensors 420 and 422 could be replaced by a single, 2D rotational sensor package which provides outputs of rotational motion along, e.g., the y and z axes. One exemplary 2-D rotational sensor is the InvenSense IDG-300, although it will be appreciated that other sensors/sensor packages may also be used. An exemplary 3-D rotational sensor is the InvenSense IMU-3000. The rotational sensors 420, 422 can be 1-D, 2-D or 3-D sensors. The accelerometer 424 can, for example, be a 3-axis linear accelerometer, although a 2-axis linear accelerometer could be used by assuming that the device is measuring gravity and mathematically computing the remaining 3rd value. Additionally, the accelerometer(s) and rotational sensor(s) could be packaged together into a single sensor package. Other variations of sensors and sensor packages may also be used in conjunction with these exemplary embodiments.

Figure 5:
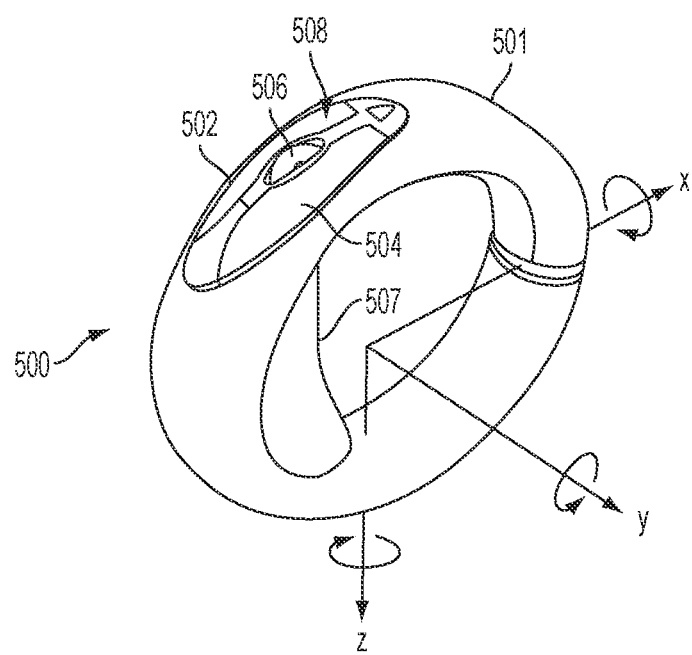
FIG. 5 shows another 3D pointing device in which exemplary embodiments can be implemented.

The exemplary embodiments are not limited to the industrial design illustrated in FIGS. 3 and 4, but can instead be deployed in any industrial form factor, another example of which is illustrated as FIG. 5. In the exemplary embodiment of FIG. 5, the 3D pointing device 500 includes a ring-shaped housing 501, two buttons 502 and 504 as well as a scroll wheel 506 and grip 507, although other exemplary embodiments may include other physical configurations. The region 508 which includes the two buttons 502 and 504 and scroll wheel 506 is referred to herein as the "control area" 508, which is disposed on an outer portion of the ring-shaped housing 501.

Figure 6:
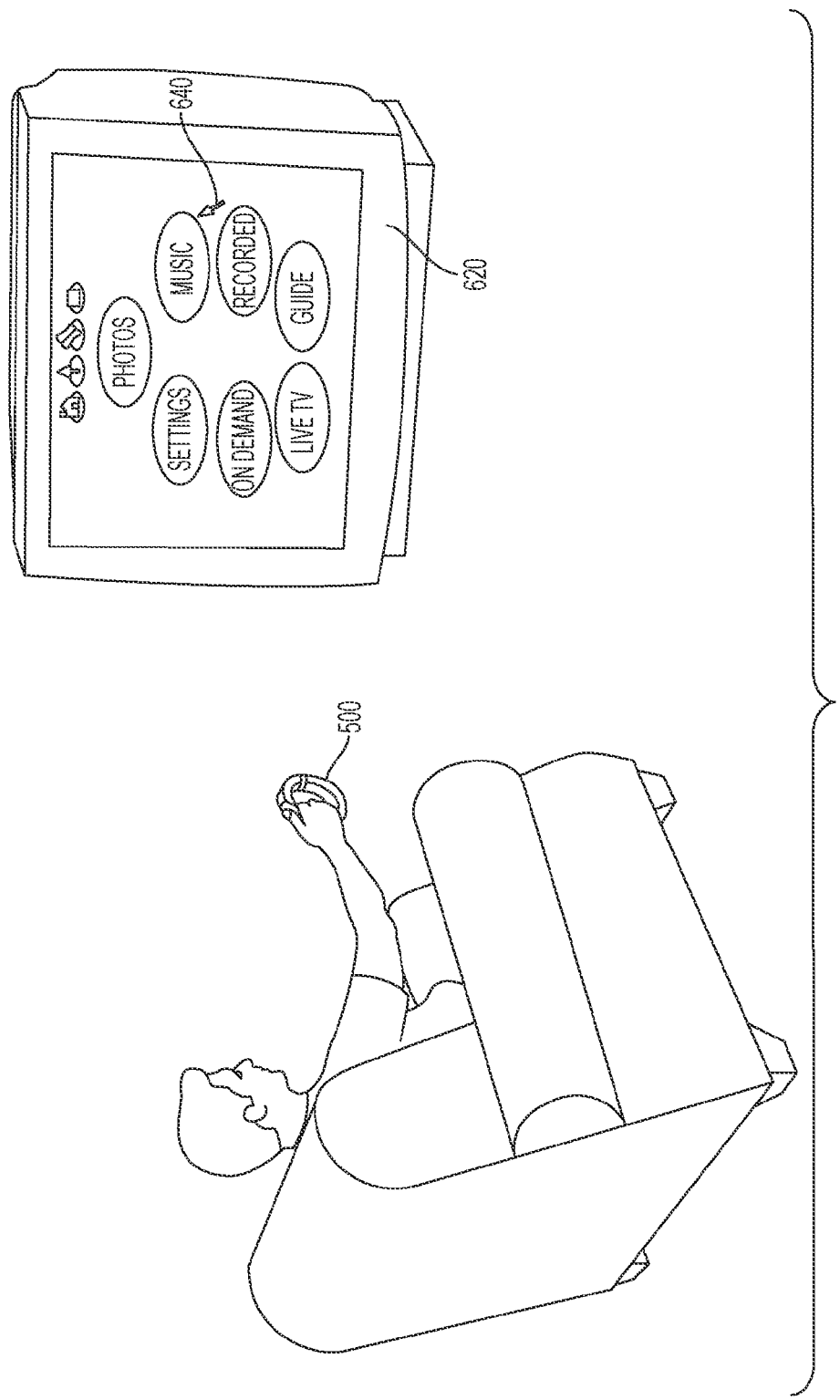
FIG. 6 depicts the 3D pointing device of FIG. 5 being used as part of a "10 foot" interface.

More details regarding this exemplary embodiment can be found in U.S. patent application Ser. No. 11/480,662, entitled "3D Pointing Devices", filed on Jul. 3, 2006, the disclosure of which is incorporated here by reference. Such devices have numerous applications including, for example, usage in the so-called "10 foot" interface between a sofa and a television in the typical living room as shown in FIG. 6. Therein, as the 3D pointing device 500 moves between different positions, that movement is detected by one or more sensors within 3D pointing device 200 and transmitted to the television 620 (or associated system component, e.g., a set-top box (not shown)). Movement of the 3D pointing device 500 can, for example, be translated into movement of a cursor 640 displayed on the television 620 and which is used to interact with a user interface. Details of an exemplary user interface with which the user can interact via 3D pointing device 500 can be found, for example, in the above-incorporated U.S. patent application Ser. No. 10/768,432 as well as U.S. patent application Ser. No. 11/437,215, entitled "Global Navigation Objects in User Interfaces", filed on May 19, 2006, the disclosure of which is incorporated here by reference. This exemplary embodiment focuses on pointing and cursor control. One skilled in the art will recognize that this same ZRO method can be used for angular rate determination, angular position determination, linear position determination and gesture recognition.

One challenge faced in implementing exemplary 3D pointing devices 400 in accordance with these exemplary embodiments is to employ components, e.g., rotational sensors 502 and 504, which are not too costly, while at the same time providing a high degree of correlation between movement of the 3D pointing device 400, a user's expectation regarding how the user interface will react to that particular movement of the 3D pointing device and actual user interface performance in response to that movement. For example, if the 3D pointing device 400 is not moving, the user will likely expect that the cursor ought not to be drifting across the screen. Likewise, if the user rotates the 3D pointing device 400 purely around the y-axis, she or he would likely not expect to see the resulting cursor movement on display 408 contain any significant x-axis component.

To achieve these, and other, aspects of exemplary embodiments of the present invention, various measurements and calculations are performed, e.g., by the handheld device 400, which are used to adjust the outputs of one or more of the sensors 420, 422 and 424 and/or as part of the input used by a processor to determine an appropriate output for the user interface based on the outputs of the sensors 420, 422 and 424. These measurements and calculations are used to compensate for factors which fall broadly into two categories: (1) factors which are intrinsic to the 3D pointing device 400, e.g., errors associated with the particular sensors 420, 422 and 424 used in the device 400 or the way in which the sensors are mounted in the device 400 and (2) factors which are not intrinsic to the 3D pointing device 400, but are instead associated with the manner in which a user is using the 3D pointing device 400, e.g., linear acceleration, tilt and tremor. Some exemplary techniques for handling these effects are described in the above-incorporated by reference '518 patent and in U.S. Patent Publication 20090033807, the disclosure of which is also incorporated here by reference. However the following exemplary embodiments provide additional techniques for handling the bias or offset error contributions to sensed motion which were described in the Background section above.

Zero-Rate Output Determination

Angular velocity sensors are commonly called gyroscopes, gyros, MEMS gyroscopes, MEMS rotational sensors, rotation sensors, angular rate sensors, rate gyroscopes, Coriolis vibratory gyroscopes and rotational rate sensors. Angular velocity sensors often contain the actual angular velocity superimposed with a bias value. This bias or offset is often called the zero-rate output (ZRO). The ZRO generally consists of two parts: a deterministic part called initial offset and a random part. The initial offset refers to the non-zero measurement of the angular velocity sensor when it is just powered up without angular velocity. The initial offset is deterministic in nature and can be mostly determined by calibration.

Usually each individual sensor has a different initial offset due to MEMS manufacturing processes. Moreover, the values may vary over a wide range, typically from −150 degree/s to 150 degree/s with a nominal value of 0 degree/s. To minimize the calibration residual, each sensor can requires its own calibration. However, this adds complexity and production time. A more common practical approach is to use a nominal calibration value which is evaluated across a majority of different units of the same type angular velocity sensors. By doing this, for each individual sensor, the calibration residual is still large. The random part is called offset drift, which refers to the drift of the offset of the sensor over time. This random part typically consists of a temperature dependent term, an aging dependent term and a residual random term. The offset drift is random but relatively small (tens degree/s variation given maximum temperature change between 0 and 50 degrees comparing with initial 150 degree/s offset) in nature and it can be modeled as a stochastic process.

For example, the InvenSense angular velocity sensors including the IDG-300, IDG-400, IDG-500, ITG-3200, IMU-3000, MPU-3000, MPU-600 and IXZ500 have ZRO correlated with the temperature change. When a 3D pointing device using such sensors is powered on, the temperature of the angular velocity sensors exponentially increases due to their own power dissipation. The exponential decay factor is typically on the order of one minute. The operating temperature change range is typically bounded by 0 to 50 degrees for indoor consumer applications. Therefore, the effect of initial offset residual after nominal calibration dominates the initial ZRO for the very beginning time (0 to 30 seconds) following power on. A noticeable drift would appear to the users of the device if it is not compensated. The exemplary embodiments described in the above-incorporated by reference U.S. Patent Publication US 2009/0033807 track ZRO very well during temperature change. However they do not work as well in two situations:

1. initial ZRO residual after calibration is greater than 50 degree/s 2. during moderate/fast motion.

Under either of those cases, the previously described bias tracking algorithms could take over 10 seconds to converge. These earlier algorithms also synthesize highly-accurate motion information (require both high-accurate calibration) to yield a ZRO estimate, and that sophistication creates increased computational complexity (cost) and decreased tolerance to error.

Ideally motion control applications would converge to the ZRO value immediately. However, these applications can typically tolerate a convergence time of 2 seconds. On the other hand, commercial products demand lower costs in every aspect such as sensor(s), micro-processor, memory, manufacturing process, etc. Thus less complex ZRO tracking algorithms requiring less processing power and memory, using cheaper sensor(s) and less complex production process are needed. One significant challenge is separating true ZRO from constant-speed human motion in a short time duration. That is, when the device is powered on, the device may be moving. The initial value output by the sensor(s) may therefore not be the true ZRO value. Accordingly, a simple ZRO tracking algorithm that converges too quickly will yield a value that includes both the true ZRO and some component of motion. For a cursor control application, this simple ZRO algorithm will result in an apparent motion once the user stops moving the device. This false motion is called backlash. A linear time-invariant filter cannot converge to a ZRO value fast enough (<4 seconds) without producing backlash in motion cases. Another significant challenge is to still track ZRO well during motion. The larger the motion, the bigger error incurred by the ZRO estimate. The presence of motion increases the convergence time for most algorithms.

According to exemplary embodiments, a new angular velocity sensor ZRO-tracking filter is presented below. Exemplary embodiments use the shared recursive form of a Kalman filter and a cumulative/exponential moving-average filter, the gain is computed as the mixed function of the Kalman gain and a moving-average coefficient. Furthermore, the constraint is enforced on the predicted estimate variance used in Kalman gain computation. Such exemplary embodiments combine both advantages taken from an averaging filter and an unconstraint Kalman filter, provide quicker convergence to the true ZRO value even during motion of the device, and produce almost no backlash after convergence. Exemplary embodiments are also capable of distinguishing between constant-speed human motion of the device and a device which is stationary, i.e., without intended motion but with a non-zero output due to sensor bias. Another advantage is that this exemplary embodiment can tolerate more sensor calibration error.

Figure 7:
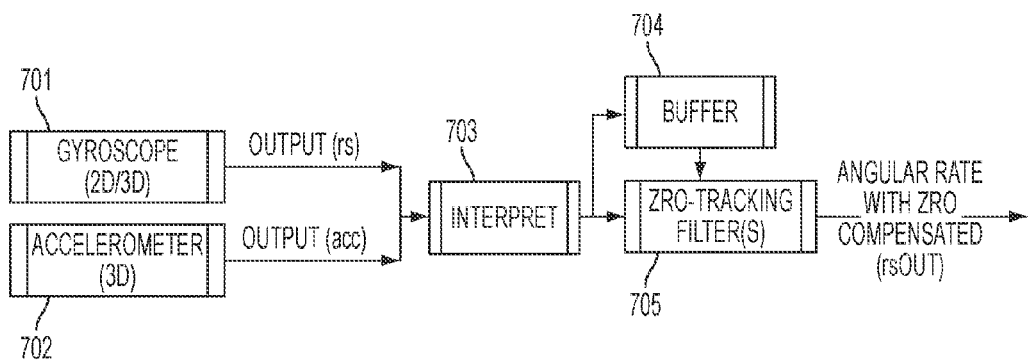
FIG. 7 illustrates a system block diagram which takes angular velocity sensor data and uses a ZRO filter to compensate that data according to an exemplary embodiment.

FIG. 7 is a system block diagram based upon which these exemplary embodiments will be described in more detail. Therein, an exemplary 2D or 3D angular velocity sensor 701 and an optional exemplary 3D linear accelerometer provide angular velocity and acceleration outputs, respectively. An optional sensor output interpretation block 703 can be provided to process the raw sensor outputs before passing the outputs to a data buffer 704 and ZRO tracking filter(s) 705. For example, sensor output interpretation block 703 can, if present use pre-computed statistical, nominal values associated with sensors 701 and/or 702 to improve the sensor(s) output while also converting the raw output into standardized units. The data buffer 704 can be provided to device 700 to store historical angular velocity measurements (rs) and acceleration measurements (acc), which historical data can be used by the ZRO filter(s) 705 as described below. The one or more ZRO-tracking filters 705 operate as described in detail below to process the angular velocity sensor 701's output to generate angular velocity output which is compensated for the ZRO of the sensor 701. Thus, generally speaking, the system or device 700 provides the angular velocity sensor output and the linear accelerometer output (optional) to the new ZRO-tracking filter/algorithm described below, and then outputs the angular velocity with the ZRO having been compensated. It will be appreciated that the system 700 can be implemented in any of the devices or systems described above with respect to FIGS. 1-6, or other devices or systems.

Figure 8:
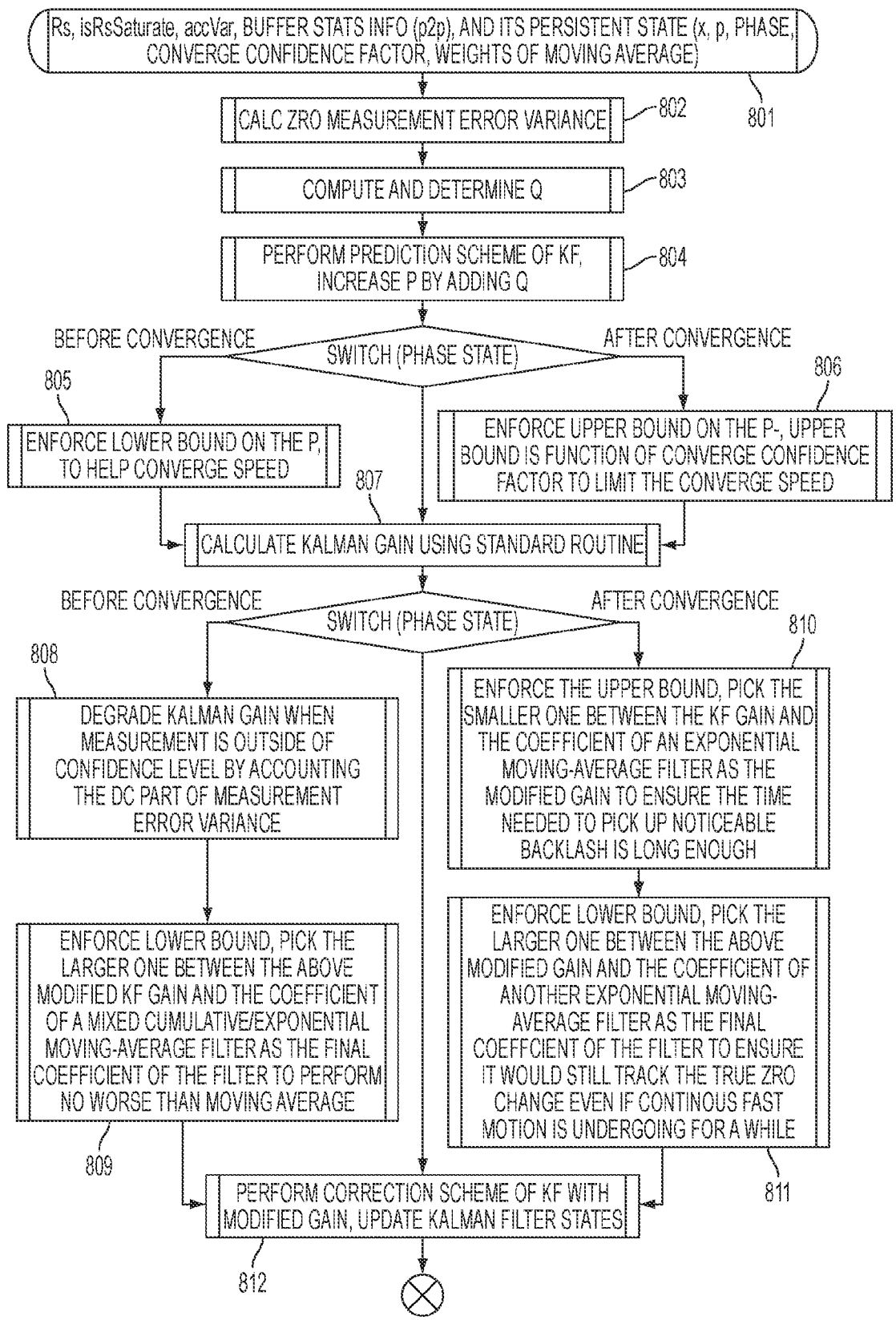
FIG. 8 is a flow diagram illustrating operation of a ZRO filter according to an exemplary embodiment.

With this context in mind, the discussion now moves on to a detailed discussion of an exemplary ZRO-tracking filter 705 according to an exemplary embodiment. FIG. 8 is a flow diagram illustrating the operation of such a ZRO-tracking filter 705. Therein, at step 801, certain inputs are provided to the ZRO-tracking filter 705, specifically the angular velocity output value (rs), isRSSaturate, accVar (optional), buffer stats info (p2p), the persistent state of the filter 705, i.e., x, p, phase, converge confidence factor, and weights of the moving average filter. According to this exemplary embodiment, the ZRO-tracking filter 705 is implemented as a combination of a moving-average filter and an unconstrained Kalman filter which results in a constrained Kalman filter that, as will be shown below, converges to a "true" ZRO value associated with sensor(s) 701 more rapidly than either a moving-average filter or an unconstrained Kalman filter would by itself. Moreover, the constraint is also enforced on the predicted estimate variance used in the Kalman gain computation to ensure a still fast convergence to truth even if the filter was instead tracking toward a constant-motion signal before convergence, and the effect of backlash induced by moderate or fast constant-speed motion will be significantly reduced after convergence.

Thus the filtering process illustrated in FIG. 8 begins, at steps 802 and 803, with one dimensional Kalman filtering using a random walk process model, although those skilled in the art will appreciate that these exemplary embodiments can be extended to higher dimensions. More specifically, in step 802, a ZRO measurement error variance is calculated. The Kalman filter architecture achieves the "optimum" performance in the least mean squared sense and assumes that the measurement noise is white Gaussian. However, the measurement $M_n$ used here is $RS_n$. The dominant part of $RS_n$ is human hand-driven motion which is well band-limited. This makes it highly colorful and the Gaussian's variance is highly dynamic in time. Even discarding the color part, to achieve "suboptimal" performance, accurately estimating the measurement error variance $R_n$ for each time step is important. Ideally $R_n$ is given as the following:

$$R_n = E[(RS_n - X_n)^2] = E[(RS_n - E[RS_n] + E[RS_n] - X_n)^2]$$

$$= \text{Var}(RS_n) + E[(E[RS_n] - X_n)^2]$$

$$= \text{Var}(RS_n) + E[(E[RS_n] - \hat{X}_n^- + \hat{X}_n^- - X_n)^2]$$

$$= \text{Var}(RS_n) + E[(E[RS_n] - \hat{X}_n^-)^2] + P_n^- + E[2 \cdot (E[RS_n] - \hat{X}_n^-) \cdot (\hat{X}_n^- - X_n)]$$

$$= \text{Var}(RS_n) + E[(E[RS_n] - \hat{X}_n^-)^2] + P_n^- + E[2 \cdot (-\hat{X}_n^-) \cdot (\hat{X}_n^- - X_n)]$$

$$= \text{Var}(RS_n) + E[(E[RS_n] - \hat{X}_n^-)^2] + P_n^- + E[2 \cdot (X_n - \hat{X}_n^-) \cdot (\hat{X}_n^- - X_n)]$$

$$= \text{Var}(RS_n) + E[(E[RS_n] - \hat{X}_n^-)^2] - P_n^-$$

Figure 9:
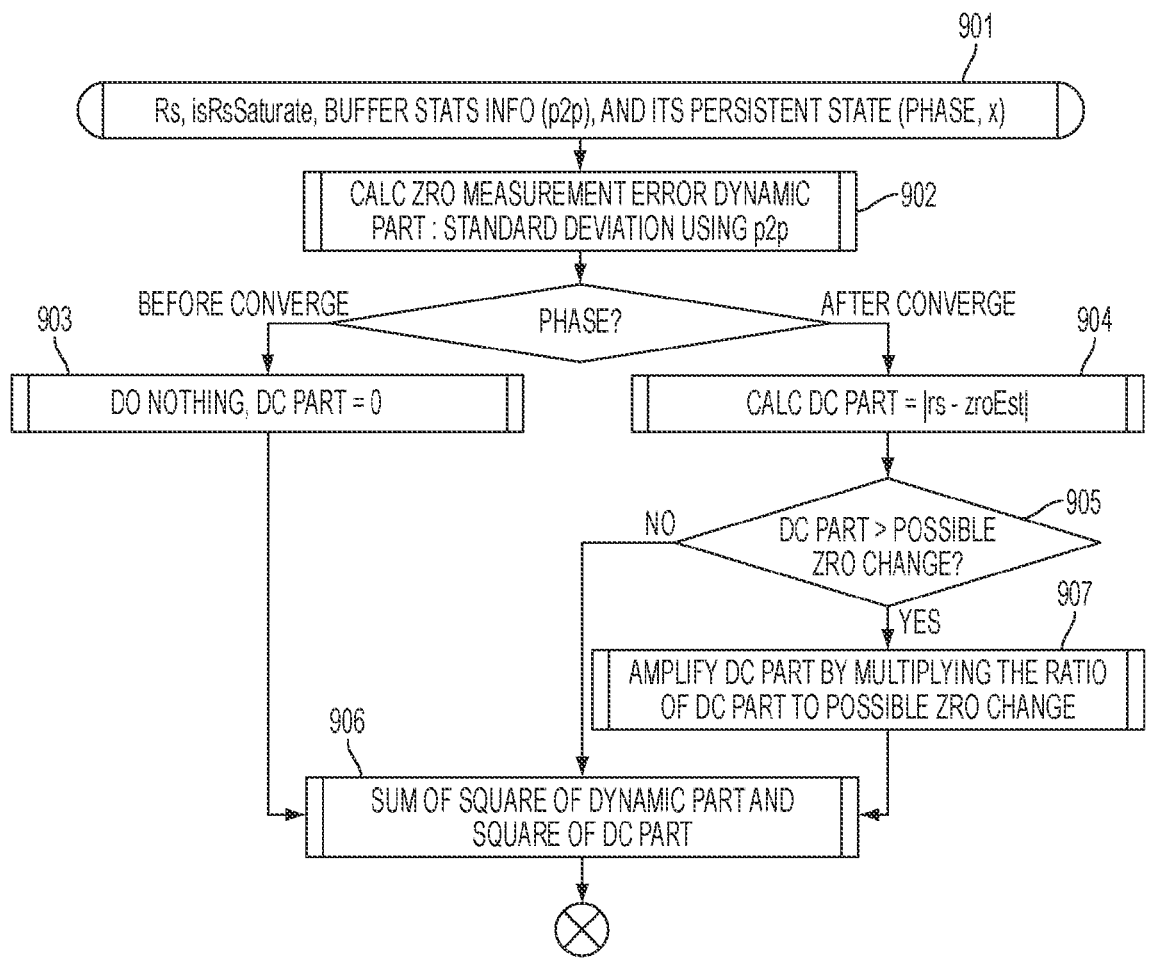
FIG. 9 is a flow diagram illustrating one of the steps of the flow diagram in FIG. 8 in more detail.

All the above are given in the least mean squared sense. A detailed example for calculating the ZRO measurement error variance is shown in the flow diagram of FIG. 9.

Therein, a subset 901 of the inputs 801 are used to calculate the dynamic part $\text{Var}(RS_n)$ of ZRO measurement variance $R_n$ at step 902. The ZRO filtering algorithm according to this exemplary embodiment uses a block buffer of L samples from buffer 704 to estimate Var(RS$_n$). On the one hand, the buffer time T$_{buffer}$=L/F$_s$ should be longer than at least one cycle of tremor T$_{tremor}$ used to drive the motion or hold the device. Tremor frequency f$_{tremor}$ is primarily located between 5 and 12 Hz. On the other hand, T$_{buffer}$ should be shorter than the normal time T$_{stopForClick}$ when users stop device movement for, e.g., icon selections on a user interface. For this exemplary embodiment, T$_{buffer}$=0.16s, although it will be appreciated that other values could be used. Since RS$_n$~N(E[RS$_n$], Var(RS$_n$)) is Gaussian distributed in such a short time frame T$_{buffer}$ based on assumption from the Kalman filter architecture, the sample variance estimates Var(RS$_n$) as:

$$\text{Var}(RS_n) \cong \frac{\sum_{i=n-L+1}^{n} \left( RS_i - \frac{\sum_{i=n-L+1}^{n}(RS_i)}{L} \right)^2}{L-1}$$

For simplicity of the algorithm (thereby reducing complexity and saving costs), the algorithm can obtain Var(RS$_n$) from p2p(RS$_{n-L+1}$, ..., RS$_n$) by calculating:

$$\text{Var}(RS_n) = f(p2p(RS_{n-L+1}, \ldots, RS_n))$$

where p2p(RS$_{n-L+1}$, ..., RS$_n$) is the peak to peak value of RS$_i$ s in the buffer window of buffer 704, L=20 for the sampling period of 0.008 seconds. Ideally P(f(p2p(RS$_{n-L+1}$, ..., RS$_n$)))=68.3% is desirable, where 68.3% is the probability that a Gaussian-distributed variable z with standard deviation of σ can normally fall into, in other words, $$P(|z-\bar{z}|=\sigma)=68.3\%$$

It turns out that:

$$P\left( \sqrt{\text{Var}(RS_n)} = \frac{p2p(RS_{n-L+1}, \ldots, RS_n)}{2.35} \right) = 68.4\%$$

As an estimate, an exemplary embodiment can thus use:

$$\sqrt{\text{Var}(RS_n)} = \frac{p2p(RS_{n-L+1}, \ldots, RS_n)}{2.35}$$

to estimate or measure the dynamic part of ZRO measurement error at step 902.

Until $\hat{X}_n$ converges to $X_n$, the algorithm does not know about E[(E[RS$_n$]−X$_n$)$^2$] since $\hat{X}_n^-$ may be far away from $X_n$. Thus, using (RS$_n$−$\hat{X}_n^-$)$^2$ as an approximation may yield much slower convergence time. Therefore, in this exemplary embodiment, (RS$_n$−$\hat{X}_n^-$)$^2$ is not counted in the R$_n$ before convergence as indicated by the "Before Convergence" path in the flowchart of FIG. 9, i.e., steps 903 and 906. Instead, this value is counted in the Kalman gain micro-adjustment (step 808 in FIG. 8) for the before-convergence case by:

$$k_n = \min\left( 1, \frac{\beta \cdot P_n^-}{(RS_n - \hat{X}_n^-)^2} \right) \cdot k_n^{kalman}$$

so that such information is not completely lost. Another reason for doing this is that the algorithm according to this exemplary embodiment thus does not pick up any arbitrary constant-motion as a new ZRO estimate or backlash. Instead, the algorithm only picks the constant-speed motion which is within the neighborhood of $\hat{X}_n^-$. By doing this, (RS$_n$−$\hat{X}_n^-$)$^2$ plays a weaker adjustment in the k$_n$ as compared to a method which instead includes it in the R$_n$ calculation, which helps convergence speed while such information is still used.

The algorithm has no accurate information for calculating E[(E[RS$_n$]−X$_n$)$^2$] for the time before convergence, so R$_n$ is underestimated, which reduces convergence time. However, since R$_n$ ignores the term E[(E[RS$_n$]−X$_n$)$^2$] pre-convergence, this could cause updated p$_n$ to be significantly underestimated in the case of continuous nearly constant motion of the device. As a consequence, this feature of algorithms according to this exemplary embodiment could lead the algorithm to track to the other nearly constant-motion signal instead of X$_n$, resulting in the convergence speed to X$_n$ being much slower than is expected. In that case, the filter 705 should correct itself and track X$_n$ quickly as long as the next measurements have a high certainty about the true X$_n$. Therefore, a lower bound LP$_{beforeConverge}$ constraint is enforced 805 by this exemplary embodiment on P$_n^-$ to help correct such a situation as:

$$P_n^- >= LP_{beforeConverge}$$

This lower bound, shown in FIG. 8 as step 805, ensures a quick correction if the filter 705 starts to incorrectly track toward the wrong value. The selection of LP$_{beforeConverge}$ is strongly correlated to the distribution of (R$_n$)$_{stationary}$ when the device 700 is not being moved intentionally by a user holding the device. Another way to allow the filter 705 to quickly correct itself is to open Q, however Q can be accumulated into a very large value if not absorbed timely, that leads to other problems if such a big Q value is absorbed by wrong candidate of the ZRO filter (i.e., constant-speed motion). This could occur because of the way the algorithm calculates R$_n$. Instead, by using a bounding constraint on the Kalman filter as shown in step 805, a minimum speed for convergence is ensured while not generating an accumulating open Q value, which might cause the filter to track to an arbitrary, incorrect ZRO. According to one exemplary embodiment, the bound LP$_{beforeConverge}$ can meet:

$$k_n^{kalman} >= \frac{1}{1 + \frac{(R_n)_{stationary}}{LP_{beforeConverge}}} = K_1, \forall\ (R_n)_{stationary}$$

where K$_1$ is the predesigned minimum Kalman gain before convergence. The selection of K$_1$ depends on how many samples the filter requires for convergence. As it is discussed above, (R$_n$)$_{stationary}$=Var(RS$_n$)$_{stationary}$. Thus, the choice of LP$_{beforeConverge}$ depends on K$_1$, σ$_{tremor}^2$, sensor noise σ, and its quantization error.

Returning to FIG. 9, after $\hat{X}_n$ converges to X$_n$, i.e., following the "After Converge" path from the Phase? Decision block, the algorithm uses (RS$_n$−$\hat{X}_n^-$)$^2$ to approximate E[(E[RS$_n$]−X$_n$)$^2$]=E⌊(E[RS$_n$]−$\hat{X}_n^-$)$^2$⌋−P$_n^-$ at step 904 since the highest probability of E[RS$_n$] is RS$_n$ itself and P$_n^-$ is very small. After convergence, the same reason described above pre-convergence for preventing the cumulative Q effect on P$_n^-$ is valid, so that in order for the filter 705 to avoid tracking to a new and incorrect ZRO in seconds, an upper bound is enforced 806 as:

$$k_n^{kalman} <= \frac{1}{1 + \frac{(R_n)_{motion}}{UP_{afterConverge}}} = K_2, \forall (R_n)_{motion}*$$

where $K_2$ is the predesigned maximum Kalman gain after convergence. This constraint enforcement on the Kalman filter is shown in step 806 in FIG. 8.

The selection of $K_2$ determines, for example, how many samples are required from the filter 705 to track a full ZRO change. Bigger values of $K_2$ allow for faster tracking of the new $X_n$ while also allowing more false ZRO tracking. Thus, the choice of $UP_{afterConverge}$ depends on $K_2$, $Tol_{\hat{X}}$, $\sigma_{tremor}^2$, sensor noise $\sigma$, and its quantization error. Since $UP_{afterConverge}$ can be flexible based on different selection of $K_2$, $K_2$ can be based on the convergence confidence factor. The stricter convergence condition $\hat{X}_n$ that is met, the greater confidence the algorithm has in $\hat{X}_n$ and thus the smaller the value of $K_2$ that is needed. According to one exemplary embodiment, the upper bound 806 can be implemented as:

$$UP_{afterCoverge} = C \cdot 2^{-CF} \, (rad/s)^2$$

Another reason for this upper bound 806 is for the case where the $\hat{X}_n$ value converges to $X_n$ very quickly such that $P_n^-$ may still be very open so that it is allowed to track to a new and incorrect ZRO value easily. Thus such bound is helpful.

After convergence, the algorithm also compares the $|RS_n - \hat{X}_n^-|$ with possible true ZRO change at step 905. If $|RS_n - \hat{X}_n^-|$ is bigger than the possible true ZRO change, it is highly likely the current measurement contains some constant motion part. Thus, the algorithm downgrades the weight of current sample by amplifying $|RS_n - \hat{X}_n^-|$ in error variance computation with a factor of the ratio of $|RS_n - \hat{X}_n^-|$ to maximum possible true ZRO change at step 907. A lower bound is enforced on final $R_n$ to ensure it would not be smaller than the angular velocity sensor's noise $\sigma^2$ for the case due to the imperfectness of buffer window size and approximation of $R_n$.

Figure 10:
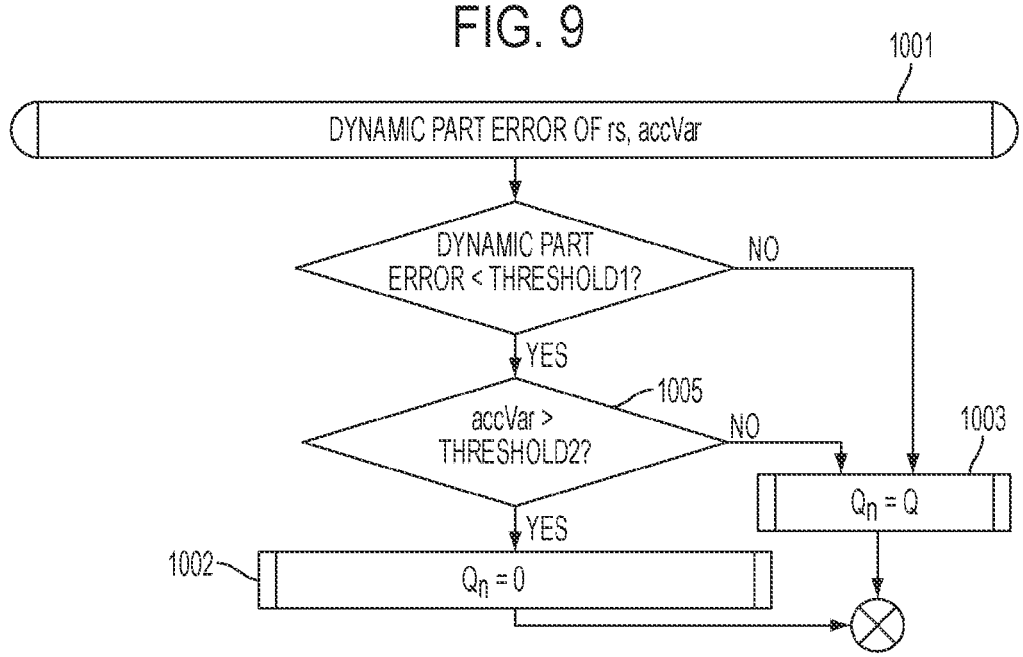
FIG. 10 is a flow diagram illustrating another one of the steps of the flow diagram in FIG. 8 in more detail.

Having described the measurement error variance portion of the constrained Kalman filter implementation of ZRO filter 705 according to this exemplary embodiment, the discussion now moves on to the determination of Q (step 803), i.e., the process error variance. According to one exemplary embodiment, illustrated in FIG. 10, a constant process error variance can be used such that:

$$Q_n = Q$$

Here the algorithm computes $R^{acc}$ at step 1001 (optional) using historical data in buffer 704 as:

$$R^{acc} = (p2p(Acc_{n-L+1}, \ldots, Acc_n))^2$$

For this purely illustrative exemplary embodiment, suppose that the application only wishes to allow 0.01 rad/s of ZRO estimate change per 4 seconds. Therefore, Q is chosen to be:

$$Q = \frac{0.01^2}{4 \cdot F_s} = 2 \cdot 10^{-7} (rad/s)^2$$

Two exceptions are if (1) the device is moving too quickly or (2) motion of the device is nearly constant so that it is hard to tell whether it is intended motion by a user or the device is stationary. If the linear accelerometer dynamics are not too small, it is highly likely that intended user movement is being detected. Thus, the Z-axis linear accelerometer is used to evaluate the dynamics of Y-axis angular velocity, and the Y-axis linear accelerometer is used to evaluate the dynamics of Z-axis angular velocity since those pairs are highly correlated respectively. If $Q_n$ accumulates into $P_n^-$ under either condition, then the algorithm will track the next small motion incorrectly. For both conditions, this information is helpful before convergence. This information is less useful after convergence since the upper bound on $P_n^-$ limits the convergence rate.

Some thresholds are used in this exemplary embodiment for defining fast motion and slow motion, and one threshold is used for defining high dynamics of linear accelerometer data. By expanding the 1-D Kalman filter equation with unity measurement and process, the next value of P is given by:

$$P_n = \left(1 - \frac{P_{n-1} + Q_n}{P_{n-1} + Q_n + R_{max}}\right)(P_{n-1} + Q_n) = P_{n-1}$$

The largest value of R that does not increase P with respect to the previous P is given by:

$$R_{max} = \frac{(P_{n-1} + Q_n) \cdot P_{n-1}}{Q_n}$$

This latter equation implies that when $R_n > R_{max}$, $P_n$ would grow. To manage unbounded growth on P, $Q_n$ can be adjusted to match $R_n$ so that $P_n$ either never grows or grows at a controlled rate. For the constant motion case, $$\frac{P_{n-1} + Q_n}{P_{n-1} + Q_n + Var(R_n)_{constMotion}} <= K_3 \Rightarrow \frac{Var(R_n)_{constMotion}}{P_{n-1} + Q_n} >= \frac{1}{K_3} - 1$$

while $$\frac{Var(R_n)_{stationary}}{P_{n-1} + Q_n} <= \frac{1}{K_4} - 1$$

The difficulty is that there is no good way to differentiate between $Var(R_n)_{stationary}$ and $Var(R_n)_{constMotion}$ for a single sample, but the linear accelerometer's dynamics are useful. The following thresholds are empirical, purely exemplary and may be tuned for the application:

$$\sigma_{smallDyn} = 0.1$$

$$R_{motionDyn}^{acc} = 0.1$$

when $\sqrt{Var(R_n)} < \sigma_{smallDyn}$, then the motion is considered as in the region of interest (ROI). In the ROI, if $R^{acc} < R_{motionDyn}^{acc}$, then the sensor output is treated as a "stationary" case and the process flows from decision block 1005 to block 1003, otherwise it is treated as a "constant motion" case where Q=0 instead of $Q=2\cdot10^{-7}$ in step 1002.

Returning to FIG. 8, the Kalman filter prediction scheme is performed as shown in step 804. Since this exemplary embodiment is using a one dimensional Kalman filter form, the predicted ZRO estimate at time step n (before measurement) is the same as the ZRO measurement at time step n−1. This makes sense for this application if no driven signal is available (such as a temperature measurement) and still allows $\hat{X}_n$ to change over time (although not rapidly) by setting Q to be non-zero. Thus, for the ZRO filter 705:

$$\hat{X}_n^- = \hat{X}_{n-1}$$

$$P_n^- = P_{n-1} + Q_n$$

This increase in P by adding Q is also shown in step 804. Furthermore, if the measurement of ZRO at time step n is the output of angular velocity sensor itself, it is given by:

$$M_n = RS_n,$$

The output of the angular velocity sensor 701 contains four parts: true angular velocity along the sensing axis, the sensor noise, the sensor's ZRO and the sensor's calibration error. This can be expressed by the equation:

$$RS_n = \omega_n + \epsilon_{\omega_n} + X_n + \eta_n.$$

$\epsilon_{\omega_n}$ can usually be decomposed into two parts: (1) part proportional to $\omega_n$ due to scaling error, skew error, and alignment error. (2) part non-proportional to $\omega_n$, such as nonlinearity error. Often part (2) is negligible comparing to part (1). The equation can be rewritten as:

$$\epsilon_{\omega_n} = \alpha \omega_n + \zeta_{\omega_n}$$

where $\alpha$ is constant, and $|\alpha| < 0.1$ for most MEMS angular velocity sensors. For short time duration, $X_n$ can be seen as constant since it does not change too rapidly. $\eta_n$ represents sensor noise itself and is a random process, and usually normal distributed with mean of zero and constant standard deviation of $\sigma_n = \sigma$ since the sensor noise level changes very slowly and very little.

Having described some of the basic elements of the recursive Kalman filtering performed by ZRO filter 705, a further discussions of the constraints and combination with moving-average coefficient, some of which were introduced above, employed in exemplary embodiments to bound some of the Kalman filter parameters will now be provided. The convergence speed of an unconstraint standard Kalman filter is strongly dependent on the ratio of the predicted estimate error variance $P_n^-$ to the measurement error variance $R_n$. For a single measurement, the measurement error variance $R_n$ is not small enough until the device is purely stationary. The faster the input motion is, the bigger the error variance is. In general, a suitable ZRO tracking/filtering algorithm would require many measurements with small error variances to converge even if the device is stationary. With a reasonable amount of input motion to the device 700, convergence can take tens of seconds.

On the other hand, the error of the estimated ZRO using cumulative moving-average filter $\epsilon_{\tilde{X}_n}$ is strongly depending on $\Delta \psi_n$ and the total elapsed time used for averaging. This can be expressed as the following equation:

$$\varepsilon_{\tilde{X}_n} = \frac{1}{n} \cdot \sum_{i=1}^{n} RS_i - X_n = \frac{1}{n} \cdot \sum_{i=1}^{n} (\omega_i + \varepsilon_{\omega_i} + X_i + \eta_i) - X_n$$

$$= \frac{1}{n} \cdot \sum_{i=1}^{n} (\omega_i + \varepsilon_{\omega_i}) + \frac{1}{n} \cdot \sum_{i=1}^{n} \eta_i + \frac{1}{n} \cdot \sum_{i=1}^{n} X_i - X_n$$

$$= \frac{1}{n} \cdot \sum_{i=1}^{n} ((1 + \alpha) \cdot \omega_i + \zeta_{\omega_i}) + \frac{1}{n} \cdot \sum_{i=1}^{n} X_i - X_n$$

The first part can be further rewritten as:

$$\frac{1}{n} \cdot \sum_{i=1}^{n} ((1 + \alpha) \cdot \omega_i) = \frac{1 + \alpha}{n} \sum_{i=1}^{n} \omega_i = \frac{1 + \alpha}{n} \Delta \psi_n \cdot F_s$$

If n is small enough so that $\Delta$ZRO evolved during $$t_n = \frac{n}{F_s}$$

which is less than $\text{Tol}_{\tilde{X}}$, then $$-\frac{\text{Tol}_{\tilde{X}}}{2} < \frac{1}{n} \cdot \sum_{i=1}^{n} X_i - X_n < \frac{\text{Tol}_{\tilde{X}}}{2}$$

And if $$\zeta_{\omega_i} \ll \alpha \omega_i \text{ or } \frac{1}{n} \sum_{i=1}^{n} \zeta_{\omega_i} \ll \text{Tol}_{\tilde{X}},$$

the equation of $\epsilon_{\tilde{X}_n}$ can be simplified as:

$$\varepsilon_{\tilde{X}} \approx \frac{1 + \alpha}{n} \Delta \psi_n \cdot F_s + \xi$$

where takes $\xi$ both ZRO change during averaging and non-linearity error into account and:

$$|\xi| < \frac{\text{Tol}_{\tilde{X}}}{2}$$

For many applications of angular velocity sensors, such as the 3D pointing devices described above, continuously intentional rotations in one direction do not occur in the long term. In other words:

$$\lim_{n \to +\infty} \frac{\Delta \psi_n \cdot F_s}{n} \to 0$$

Users of such devices 700 often rotate around a center angle position, and the maximum moved angle is typically bounded by a screen boundary or the physical maximum angle allowed by human wrist joint or elbow joint. Thus, for most cases:

$$|\Delta \psi_n| <= \Psi$$

More typically, people intend to move from one angular position to another, and back to almost the same angular position again some time later. This motion usually occurs within several seconds so that:

$$|\Delta \psi_n| \approx 0 \exists n < T_{bound} \cdot F_s$$

where $T_{bound}$ is between 0 and 5 seconds for most cases.

Therefore, $\epsilon_{\tilde{X}_n} \approx 0 \exists n < T_{bound} \cdot F_s$, so for the time right after the angular velocity sensor is powered on, even during motion, as long as the angular velocity sensor rotates from one angular position to another, and back to almost the same angle position again within several seconds, no matter how fast it moves (except for sensor saturation), the cumulative moving-average could yield very small error close to zero some time during averaging. Methods and devices for performing ZRO tracking and filtering according to these exemplary embodiments combines the advantages of both a standard Kalman filter and a moving-average filter to yield a better ZRO estimate and enable better ZRO compensation. The ZRO filter has two phases: "before convergence" and "after convergence". Each phase uses different constraints and combination method according to some exemplary embodiments. The details are as follows:

Before $\hat{X}_n$ is converged to $X_n$, and as described briefly above, two constraints are enforced to help the filter converges much faster. Using one constraint (step 805), the predicted estimate error variance is enforced with a lower bound:

$$P_n^- >= LP_{beforeConverge}$$

This ensures:

$$k_n^{kalman} = \frac{P_n^-}{P_n^- + R_n} = \frac{1}{1 + \frac{R_n}{P_n^-}} >= \frac{1}{1 + \frac{R_n}{LP_{beforeConverge}}}$$

In general, the algorithm chooses $$\frac{R_n}{LP_{beforeConverge}}$$

to be comparable with 1 for the case of that device is stationary (i.e., no intentional movement of the hand) so that it takes only several samples to converge to $X_n$. While there is motion, $$\frac{R_n}{LP_{beforeConverge}}$$

is still >>1 so that the impact of this constraint is not significant. Thus the selection of $LP_{beforeConverge}$ is strongly depending on $(R_n)_{stationary}$.

Different people may have different $(R_n)_{stationary}$ due to human-hand tremor. This variation was discussed above in the context of calculating the measurement error variance. By doing this, no matter what values the filter is converging to and/or how long the running time of the filter has elapsed since start, the minimum speed of converging from current value to $X_n$ of the filter is guaranteed when the device is not in intended movement, which helps overcome the slow convergence-speed shortcoming of standard Kalman filter even when the device is truly stationary.

The final Kalman gain itself with constraint on $P_n^-$ is compared with the cumulative moving-average coefficient in step 809, and the larger one is selected as the final coefficient of the ZRO-tracking filter for phase of "before convergence" as:

$$k_n = \begin{cases} k_n^{kalman}, & k_n^{kalman} >= k_n^{MMA} \\ k_n^{MMA}, & k_n^{kalman} < k_n^{MMA} \end{cases}$$

As mentioned above, the convergence speed is much worse when the device 700 is being intentionally moved by a user for an unconstrained Kalman filter. Consider the time duration from when the device is just powered on to the first stop in intentional movement of the device by the hand of a user. There are only two cases.

1. The device stops at a different angle position: in this case an unconstrained Kalman filter alone still converges very slowly before it stops since:

$$\frac{R_n}{P_n} >> 1, \text{ such that } k_n^{kalman} << 1,$$

in the cases of moderate or fast motion, $$k_n^{kalman} < k_n^{MMA}$$

When the device stops under this motion scenario, the unconstrained Kalman filter would converge from an initial value of zero (since zero is the mean value across many device units) to the true ZRO for a particular device 700 which, as it is mentioned above, can be $\epsilon_{\hat{X}_n} \sim 150$ degree/s difference relative to this mean. Thus, the statistical mean is 150/2=75 degree/s. While the amplitude of the angle displacement moved during this time period is $|\Delta\psi_n| \in [0, \Psi]$, suppose that statistically the mean is less than 60 degrees, and the averaged time elapsed between when it is just powered up and the first stop is 1 second. Then the error on the ZRO using cumulative moving-average is:

$$\varepsilon_{\hat{X}_n} \cong \frac{1+\alpha}{n} \cdot \Delta\psi_n \cong \frac{1+0.05}{1} \cdot 60 = 63 \text{ (degree/s)}$$

where the algorithm uses $E[|\alpha|]=0.05$ in the above equation assuming $|\alpha| \in [0, 0.1]$ is uniformly distributed. Therefore, statistically:

$$\varepsilon_{\hat{X}_n} < \varepsilon_{\hat{X}_n}$$

right before the first sample of from the rotational sensor 701 arrives when the device is truly stationary (i.e., no intentional movement). This shows that the moving-average filter performs better than an unconstrained Kalman filter in a statistical sense. In the cases of small motion, $$k_n^{kalman} >= k_n^{MMA}$$

the ZRO-tracking filter picks the Kalman gain as its final coefficient, and the converging speed may be even faster depending how flat the output of the angular velocity sensor is although it may converge away from $X_n$.

After the first sample of stationary output from the rotational sensor arrives, for most cases:

$$k_n^{kalman} >> k_n^{MMA}$$

This converges to $X_n$ in several samples given the first constraint on $P_n^-$.

2. In the second motion scenario, the device 700 returns to almost the same angle position at which it started upon power up. This second case can be expressed as:

$$\varepsilon_{\hat{X}_n} \cong \frac{1+\alpha}{n} \cdot \Delta\psi_n \cong \frac{1+0.05}{1} \cdot 10 = 10.5 \text{ (degree/s)}$$

Here this equation assumes $\Delta\psi_n < 10$ degree, which assumption holds for most cases. So that, $$\varepsilon_{\hat{X}_n} << \varepsilon_{\hat{X}_n}$$

right before the first sample of stationary output data arrives at the filter. This shows that the moving-average filter performs much better than an unconstrained Kalman filter in a statistical sense. However the $\epsilon_{\hat{X}_n}$ is still not small enough for many applications. The Kalman filter helps this situation. After the first sample of stationary data arrives, again, for most cases, $$k_n^{kalman} >> k_n^{MMA}$$

This converges $\epsilon_{\hat{X}_n} \cong 10.5$ (degree/s) to zero in several samples too, while the moving average may still take a while to reduce the error.

In sum, the constrained Kalman filter according to this exemplary embodiment, combined with the moving-average filter at step 809 and the constraint of a lower bound on predicted estimate variance in Kalman gain computation at step 805 outperforms either an unconstrained Kalman filter or a moving average filter alone in converging an estimated ZRO value to a true ZRO value. A more detailed discussion of how to implement the moving average filter portion of this ZRO filter 705 is provided below.

After $\hat{X}_n$ is converged to $X_n$, several additional constraints can be enforced according to this exemplary embodiment to track ZRO change while tracking constant motion less. The improved tracking results in reduced backlash as follows:

1. The predicted estimate error variance is enforced with an upper bound at step 806:

This ensures:

$$k_n^{kalman} <= \frac{1}{1 + \frac{R_n}{UP_{afterCoverage}}}$$

so that for some cases of $P_n^- > UP_{afterConverge}$ even after convergence, the moderate or fast constant-speed motion will not be trusted as the new ZRO as much as it was. By doing this, the effect of backlash induced by moderate or fast constant-speed motion will be significantly reduced. Again, the selection of $UP_{afterConverge}$ was discussed in greater detail above with respect to determination of the measurement error variance.

A second constraint involves:

2. The final Kalman gain itself with constraint on $P_n^-$ is compared with a constant served as upper bound on the final coefficient of the ZRO-tracking filter for the phase of "after convergence" as shown in step 810 as:

$$k_n = \begin{cases} k_n^{kalman}, & k_n^{kalman} <= K \\ K, & k_n^{kalman} > K \end{cases}$$

For the case of slow constant-speed motion after convergence, this helps that the time of the filter needed to pick up noticeable backlash induced by such motion is long enough.

A third constraint involves:

3. The final coefficient of the ZRO filter is also constrained by a lower bound at step 811. This helps the filter 705 to still have the minimum tracking speed even if continuous moderate or fast motion is continues for a while after power on. Such a lower bound can, for example, be chosen to be the same as $$K^{EMA} = \frac{1}{1428 \cdot F_s}$$

to ensure that given maximum pi rads change of angular position in any given time interval, the gain only gives the error $<=2.2e-3$ rad/s which is not noticeable by users. However this value is purely exemplary and other values for the lower bound can be selected to tune performance for specific applications.

According to exemplary embodiments, use of this combination of the moving-average filter and the Kalman filter with constraints enables the convergence of $\hat{X}_n$ to $X_n$ to be well determined every time, under various motion scenarios of the device 700, such that an optimal performance of the filter 705 and compensation for offset, bias or ZRO is achieved.

As mentioned above, a moving average filter can be used to enforce a lower bound on the final coefficient of the ZRO filter in step 809 and 811 of FIG. 8, also used to enforce an upper bound in step 810 of FIG. 8. Next, a description of an exemplary moving average filter and corresponding set of coefficients is provided by which this aspect of the ZRO filter 705 can, for example, be implemented.

More specifically, a moving-average filter weights each output of the angular velocity sensor, so $M_n = RS_n$. An M-sample average filter has:

$$\tilde{X}_n = k_n^{MA} \cdot \sum_{i=0}^{M-1} RS_{n-i}$$

$$k_n^{MA} = \frac{1}{M}$$

In order to update this filter, $$\tilde{X}_n = \tilde{X}_{n-1} + k_n^{MA} \cdot (RS_n - RS_{n-M}),$$

which would mean provision of a buffer 704 with size M. For long-time averaging, this implies use of a large block of memory as buffer 704.

According to an exemplary embodiment, the ZRO filter algorithm uses a cumulative moving-average filter initially and, after it reaches enough samples, switches to an exponential moving average. A cumulative moving-average filter is typically an un-weighted average of the sequence of input values from time step 1 up to the current time as:

$$\tilde{X}_n = \frac{1}{n} \cdot \sum_{i=1}^{n} RS_i$$

The recursive format for the ZRO estimate update according to this exemplary embodiment is:

$$\tilde{X}_n = \tilde{X}_{n-1} + k_n^{MA} \cdot (RS_n - \tilde{X}_{n-1})$$

$$k_n^{MA} = \frac{1}{n}$$

An exponential moving average shares the same recursive update format as above for the ZRO estimate, while:

$$k_n^{MA} = K^{EMA}$$

Note, however, that using the exponential moving average does not require a buffer.

The cumulative moving-average filter yields the average of all the samples up to the current time instant immediately, which is good for initial samples. However, as more samples are used, the latency of the cumulative moving-average filter increases. The ZRO-tracking speed decreases since the weight is smaller and smaller. The exponential moving-average filter, on the other hand, does not yield the average until enough samples are received, but the tracking speed to a new ZRO value is constant. Thus, the final combined moving-average coefficient provided in step 801 and used in step 809, step 810, and step 811 according to this exemplary embodiment is:

$$k_n^{MMA} = \begin{cases} \frac{1}{n}, & n < \frac{1}{K^{EMA}} \\ K^{EMA}, & n >= \frac{1}{K^{EMA}} \end{cases}$$

The algorithm thus switches to an exponential-moving-average weight when the number of samples used for averaging is more than enough to yield the maximum error on the estimate less than that of interest.

Reasons for using such a combined moving-average filter according to this exemplary embodiment include:
1) every sample carries information about ZRO, and the algorithm has no reason to discard any one sample. One exception is during sensor saturation where significant error may be introduced;
2) immediate average return is desired but not at the expense of lagging behind the new ZRO for too long of a time; and
3) when more samples are included, the update rate gets slower. To guarantee a minimum ZRO-tracking speed, a threshold is enforced on $k^{MA}$ which changes the moving-average filter into an exponential moving average filter or single exponential filter.

For these reasons, $K^{EMA}$ is chosen to satisfy two conditions according to this exemplary embodiment. Each phase has an upper and lower bound on the filter gain. The terms used for the bounds are reversed between the "before convergence" and "after convergence" phases. The bounds for "before convergence" should be big enough to accommodate the ZRO change rate while not allowing excessive estimate error. The bounds for "after convergence" should be slow enough to avoid noticeable backlash while being fast enough to track possible ZRO changes. These conditions can be expressed by:

$$\begin{cases} \left(\frac{\max(\Delta X / \Delta t)}{Tol_{\hat{X}}}\right) < K^{EMA} \cdot F_s <= \frac{Tol_{\hat{X}}}{\Psi}, \text{ for the phase of before convergence} \\ Tol_{\hat{X}} < K^{EMA} \cdot F_s <= \left(\frac{\max(\Delta X / \Delta t)}{Tol_{\hat{X}}}\right), \text{ for the phase of after convergence} \end{cases}$$

However, the same $Tol_{\hat{X}}$ does not exist for satisfying both phases. Thus, for the present exemplary embodiment, the algorithm uses one value of $Tol_{\hat{X}}$ for "before convergence" and a different value of $Tol_{\hat{X}}$ for "after convergence".

For the phase of "before convergence", a bigger error of 0.06 to 0.1 rad/s is tolerable when combined with the Kalman filter. For the phase of "after convergence", the smaller error of 0.00225 to 0.01 rad/s is chosen to avoid any noticeable drift residual. Other values could instead be selected to tune performance for other applications.

Given a typical $\Delta X=0.01$ rad/s of $\Delta t=4$ seconds, $Tol_{\hat{X}}=0.1$ rad/s, $\Psi=0.8*pi$ rads, these conditions for phase of "before convergence" reduce to:

$$0.025 < K^{EMA} \cdot F_s <= 0.04$$

In order for the average to not lag too much with respect to latest ZRO, 25 seconds is used in the algorithm where:

$$K^{EMA}_{beforeConverge} = \frac{1}{25 \cdot F_s}$$

For the phase of "after converge", a smaller error tolerance of 0.00225 rad/s is chosen to guarantee that the above-described backlash effect is minimized. This speed does not guarantee the algorithm to be fast enough to track ZRO change, so this is used as lower bound in the algorithm. Therefore:

$$K^{EMA}_{afterConverge} = \frac{1}{1428 \cdot F_s}$$

In order for the algorithm to be fast enough to track ZRO change, the error tolerance of 0.01 rad/s is used to have $$K^{EMA}_{afterConverge} = \frac{1}{4 \cdot F_s}$$

It is used as the upper bound for the final coefficient of ZRO filter.

To complete the discussion of FIG. 8, once the error variance of the ZRO estimate is calculated at step 804, boundary enforcement is applied on the calculated P value in either step 805 or 806 based upon the convergence phase of the ZRO estimate. A gain for the Kalman filter is then calculated at step 807 in a typical manner, i.e., $k_n^{kalman}$ is computed using as the following:

$$S_n = P_n^- + R_n$$

$$k_n^{kalman} = \frac{P_n^-}{S_n}$$

However the calculated gain is then subjected to further processing in either steps 808, 809 or 810, 811 again depending upon the convergence phase of the ZRO estimate. Lastly, at step 812, the updated ZRO estimate at time step n after measurement is:

$$\hat{X}_n = \hat{X}_{n-1} + k_n \cdot (RS_n - \hat{X}_{n-1}) \text{ since } \hat{X}_n^- = \hat{X}_{n-1}.$$

and the updated error variance of ZRO estimate at time step n after measurement in step 812 is:

$$P_n = (1 - k_n) \cdot P_n^-$$

Since the ZRO filter according to this exemplary embodiment switches the computation method of its coefficient when the estimate converges to the truth, an effective evaluation method for judging if the current estimate is converged to the truth is significant for achieving optimum performance of such a ZRO filter. Ideally, $\hat{X}_n$ should converge whenever the device 700 first stops. When the device 700 stops, if $\hat{X}_n$ is converged, then $RS_n$ is likely near $\hat{X}_n$. The algorithm compares the difference between $RS_n$ and $\hat{X}_n$ with $Tol_{\hat{X}}$, that is:

$$|RS_n - \hat{X}\hat{X}_n| < Tol_{\hat{X}}$$

The probability that the current sample $RS_n$ is coincident with $\hat{X}_n$ is not negligible but not guaranteed. Using one sample from a single channel to determine whether $\hat{X}_n$ is converged to $X_n$ will pick up many false alarms. For example, users cannot easily rotate the device 700 with constant speeds along both axes within $Tol_{\hat{X}}$ continuously for a long time duration. Through experimental data collected on an actual device while the user attempts to move at constant angular velocity for 10 seconds, the equation:

$$\exists Tol_{\hat{X}}^2 \text{ and } T_{stableTime},$$

$$\prod_{n_0 = n - T_{stableTime} \cdot F_s}^{n} \text{step}\left(Tol_{\hat{X}}^2 - \sum_{j=1}^{\# \text{ of channels}} (RS_{n_0} - \hat{X}_{n_0})_j^2\right) > 0,$$

$$\forall n$$

is never held, even if $T_{stableTime}$ is set not too long (say <0.1s), where $$\text{step}(x) = \begin{cases} 1, x > 0 \\ 0, x <= 0 \end{cases}$$

is a step function.

However, this type of output from the device is not hard to obtain if users try to hold the device stationary in their hand for a continuous time period $T_{stationary}$ which is much longer than $T_{stableTime}$ (for example: 5 seconds). This statement suggests $$\exists\, Tol_{\hat{X}}^2 \text{ and } T_{stableTime},$$

$$\prod_{n_0=n-T_{stableTime}\cdot F_s}^{n} \text{step}\left(Tol_{\hat{X}}^2 - \sum_{j=1}^{\# \text{ of channels}} (RS_{n_0} - \hat{X}_{n_0})_j^2\right) > 0,$$

$$\forall\, n$$

for converge confidence measurement. The desired stationary detector should work even for people having tremor. Thus, the selection of $Tol_{\hat{X}}$ should take both sensor noise and human tremor into account.

For the stationary case, a single channel single sample has:

$$Var(RS_n)_{stationary} = Var(\omega_n + \epsilon_{\omega_n} + ZRO_n + \eta_n) \cong Var((1+\alpha)\cdot\omega_n) + \sigma^2 = (1+\alpha)^2 \cdot \sigma_{tremor}^2 + \sigma^2$$

For the constant-speed motion case, a single channel single sample has:

$$Var(RS_n)_{motion} = Var(\omega_n + \epsilon_{\omega_n} + ZRO_n + \eta_n) \cong Var((1+\alpha)\cdot\omega_n) + \sigma^2 = (1+\alpha)^2 \cdot \sigma_{motion}^2 + \sigma^2$$

Two observations and one fact help distinguish between $Var(RS_n)_{stationary}$ and $Var(RS_n)_{motion}$:

1. $\sigma_{motion}^2 > \sigma_{tremor}^2$ and $\sigma_{motion}^2 > \sigma^2$ (This assumption may not hold for low-resolution sensors where the quantization error is bigger than $\sigma_{motion}$)
2. Tremor is not strongly correlated across different channels (axes). The tremor across different channels reaches peaks and zeros at different times. Furthermore, the amplitude of tremor changes rapidly over time too. Thus there always exists a chance that the small amplitude would occur within several seconds. Unlike tremor, human-generated motion usually does have strong correlation across channels. This is because 1) it is difficult for a user to rotate the device perfectly along with one axis, and 2) even if a user could rotate the device perfectly along one axis, the sensor usually has cross-axis coupling residual.
3. The fact is the difference can be exaggerated by counting continues samples instead of one sample.

A false alarm rate of continuous $N=[T_{stableTime} \cdot FS]$ samples per $T_{constMotion}$ second, i.e.,:

$$Rate(Pr_{fa}, N) =$$

$$\left(\frac{T_{constMotion}}{T_{stableTime}} - 1\right) \cdot (Pr_{fa})^N \cdot (N \cdot (1 - Pr_{fa}) + (Pr_{fa})^N) + (Pr_{fa})^N < Rate_0$$

is desired. Let's define the target detection rate of single sample double channels to be $P_{td}$, then the following relationship is desirable:

$$Rate(Pr_{td}, N) =$$

$$\left(\frac{T_{stationary}}{T_{stableTime}} - 1\right) \cdot (Pr_{td})^N \cdot (N \cdot (1 - Pr_{td}) + (Pr_{td})^N) + (Pr_{td})^N > Rate_1$$

where $Rate(Pr_{td}, N)$ is the detection rate per $T_{stationary}$ time when the device is not being intentionally moved by a user.

The selection of $Tol_{\hat{X}}$ will determine both $Pr_{fa}$ and $Pr_{td}$. The combined selection of values for $T_{stableTime}$ and $Tol_{\hat{X}}$ will help to achieve the above two equations.

For example, according to one exemplary embodiment, $Tol_{\hat{X}}$ has been chosen as 0.01 rad/s, and different $T_{stableTime}$ values are used: $T_{shortStableTime}=0.04$ seconds, $T_{middleStableTime}=0.064$ seconds, $T_{longStableTime}=0.112$ seconds. $T_{shortStableTime}$ switches the filter operation phase from "before convergence" to "after convergence" with no user perceived waiting time. $T_{shortStableTime}$ accelerates the filter convergence time once the user stops moving. Often the user will pause to see the cursor on the screen or click a button. This algorithm allows the ZRO to converge during these actions.

The drawback of using $T_{shortStableTime}$ is that there is non-negligible probability (<20%) that it can converge to the wrong ZRO. $T_{middleStableTime}$ allows <5% of cases which can converge to wrong ZRO, but it would need noticeable wait time from user perspective. For some cases, users do not move the device for awhile, then $T_{longStableTime}$ can be used to ensure whether the converged value is $X_n$ or not while the false alarm rate is nearly zero (<0.01%). In the present embodiment:

$$\text{if } \prod_{n_0=n-T_{shortStableTime}\cdot F_s}^{n} \text{step}\left(Tol_{\hat{X}}^2 - \sum_{j=1}^{2} (RS_{n_0} - \hat{X}_{n_0})_j^2\right) = 0,$$

$\forall\, n$, then $CCF = 0$ $$\text{if } \prod_{n_0=n-T_{shortStableTime}\cdot F_s}^{n} \text{step}\left(Tol_{\hat{X}}^2 - \sum_{j=1}^{2} (RS_{n_0} - \hat{X}_{n_0})_j^2\right) > 0,$$

$\forall\, n$, then $CCF = 1$ $$\text{if } \prod_{n_0=n-T_{shortStableTime}\cdot F_s}^{n} \text{step}\left(Tol_{\hat{X}}^2 - \sum_{j=1}^{2} (RS_{n_0} - \hat{X}_{n_0})_j^2\right) > 0,$$

$\forall\, n$, then $CCF = 2$ $$\text{if } \prod_{n_0=n-T_{shortStableTime}\cdot F_s}^{n} \text{step}\left(Tol_{\hat{X}}^2 - \sum_{j=1}^{2} (RS_{n_0} - \hat{X}_{n_0})_j^2\right) > 0,$$

$\forall\, n$, then $CCF = 3$

Figure 11:
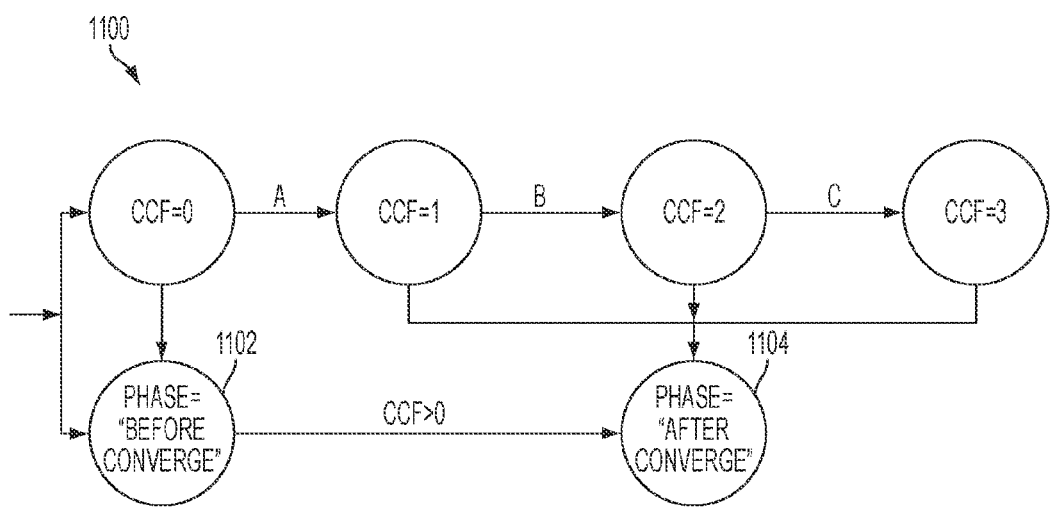
FIG. 11 is a state machine illustrating convergence confidence factors and running phases associated with a ZRO filter according to an exemplary embodiment.

A finite state machine 1100 can be used to ensure that the convergence confidence factor (CCF) is always non-decreasing, an example of which is shown in FIG. 11. Therein, when, for example, CCF=0, the ZRO-tracking filter 705 is running in the "before convergence" phase 1102, otherwise, ZRO-tracking filter is running in the "after convergence" phase 1104. It will be appreciated by those skilled in the art that both the exemplary timing values discussed above and the exemplary state machine of FIG. 11 can be implemented differently while still managing convergence confidence in accordance with the principles of this exemplary embodiment.

For most cases, $T_{shortStableTime}$ improves performance since the user observes no additional wait time and the algorithm converges rapidly. As mentioned above, this accelerated convergence comes at a 20% false alarm cost. Once the algorithm converges to a wrong value, the algorithm takes longer to converge to true ZRO since the tracking speed during phase "after convergence" is slower than that during phase "before convergence". The total convergence time then exceeds the desired system convergence time.

To overcome this limitation, two or more instances of such ZRO filter with different initial conditions may be run in a cascaded arrangement but in different phase according to another exemplary embodiment. Once the previous filter reaches quick convergence, the next filter is started. When the next filter reaches quick convergence, the two filters' estimates are compared to determine overall convergence.

This embodiment having multiple instances of the same ZRO filter embodiment uses two filters as a tradeoff between convergence time and processing. The second filter starts operate when the first filter's CCF=1. The second filter stops operation when the first filter's CCF=3. This ensures fast convergence while still allowing the system to correct the 20% false alarm in a quick fashion since the second filter starts from running phase of "before convergence" instead of "after convergence". In order to ensure that the second filter always converges to a value which is no worse than first filter's, $T_{shortStableTime}$ is not used in second filter. Instead, $T_{middleStableTime}$ is used for second filter as entry point of convergence to verify that the first filter's convergence is consistent with this second filter's convergence. If they are consistent, the first filter's convergence is on the right track, otherwise, the process updates $\hat{X}_n$ with second filter's converged value since it has no worse false alarm probability as compared with the first filter value.

Figure 12:
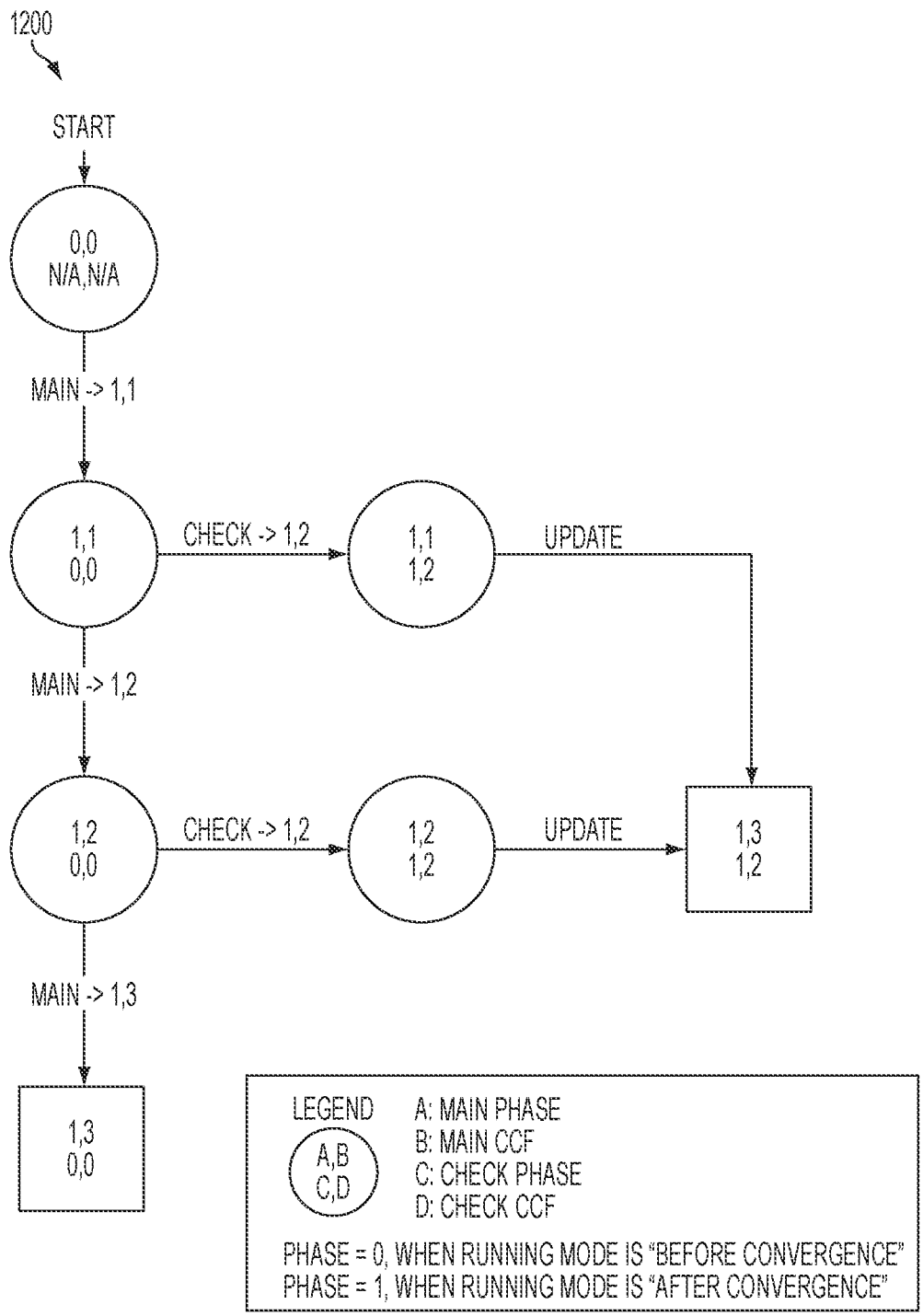
FIG. 12 is a state machine illustrating how two instances of a same ZRO filter with different initializations interact with each other and a corresponding state machine according to an exemplary embodiment.

After comparison, the first filter's CCF can be updated to value of 3 to stop the second filter from running, which saves processing time. The first filter continues running and updates $\hat{X}_n$ every time step. The first filter is called the main ZRO-tracking filter since its value is used most of the time, while the second filter is called the check ZRO-tracking filter since it's role is to verify if the first filter is converged to a good ZRO value or not. A complete combined state machine 1200 of two filters running together is shown in FIG. 12, which again is purely exemplary.

Figure 13:
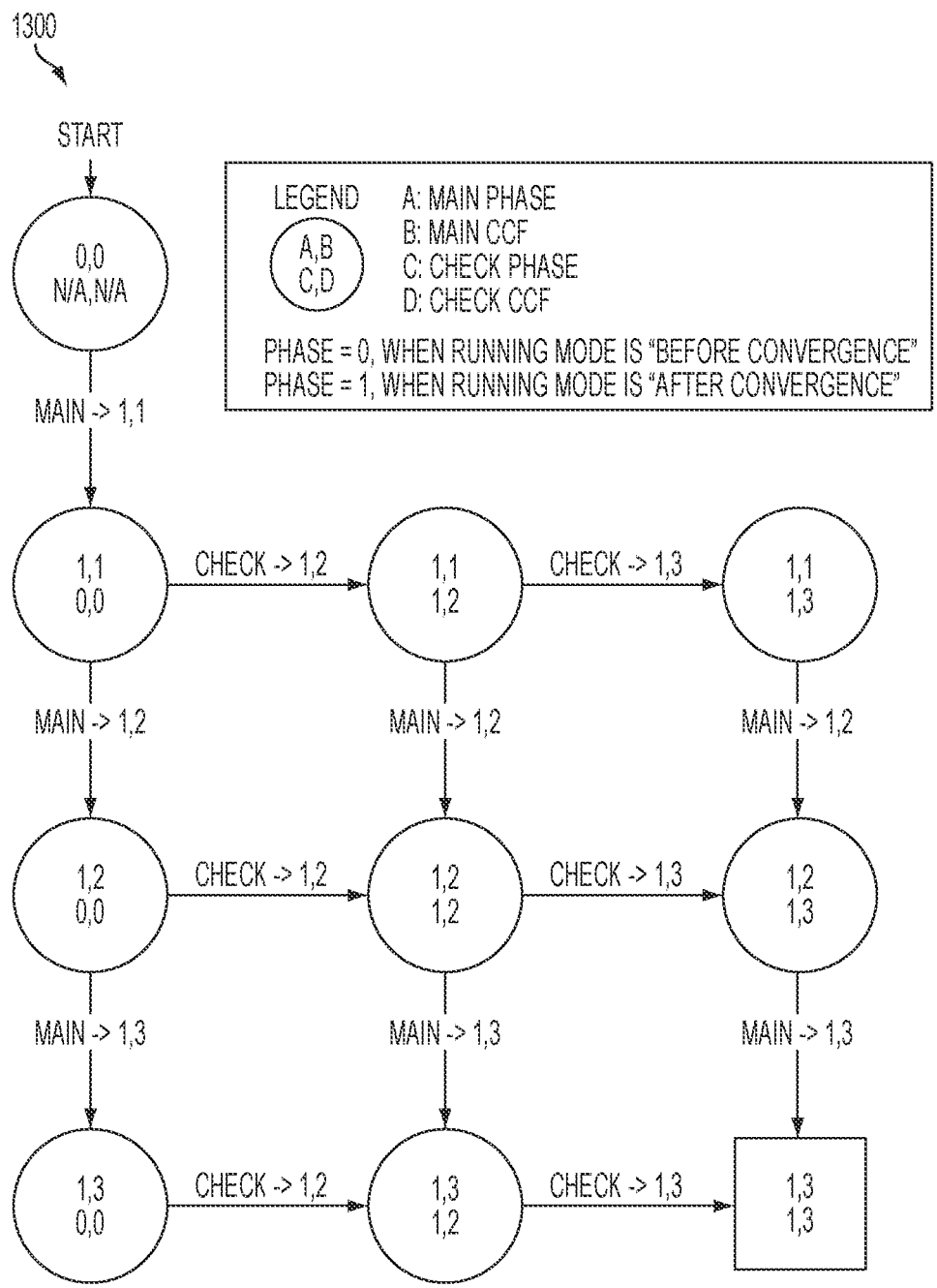
FIG. 13 is an extension of the exemplary embodiment of FIG. 12.

To ensure always a <0.01% false alarm, an extended running-time version of two filters running together can be used. The extended, combined state machine 1300 for this exemplary embodiment is shown in FIG. 13. Therein the second filter stops running until both filters reach CCF=3. The first filter still continues running and updates $\hat{X}_n$ every time step. When both filters are running, the algorithm evaluate the two filters' converged values accordingly based on their CCFs' level to yield the best $\hat{X}_n$ along the time when both filters' CCF>0.

According to another exemplary embodiment, multiple instances of the same ZRO filter can use two filters as follows. One filter serves as a "main" filter. The other filter serves two different purposes: a "pre" filter before the "main" filter is converged and a "probe" filter after the "main" filter is converged. The "main" filter runs regularly as described above. The "pre" filter shares the same initial condition and starts at the same time as the "main" filter, but has an even shorter stable time to ensure faster convergence. During the time gap between when the "pre" filter is converged and the "main" filter is not, the ZRO estimate of the "pre" filter is selected as the best ZRO estimate. After the "main" filter is converged, the "pre" filter stops running, the "probe" filter starts with a current sample as an initial condition. The "probe" filter is configured without a fixed stable time and always runs in the phase of "before convergence". The "probe" filter increments a stable time count while the measurement is near the ZRO estimate. Once the count drops back to zero, i.e., due to the current sample being outside of the neighborhood of the estimated ZRO, the count at the last sample step will serve as the weight for the current ZRO estimate from the "probe" filter to integrate with the one estimated in the "main" filter provided that the count exceeds the minimum stable time. The minimum stable time is used for eliminating any obvious false alarms, and the maximum stable time is used to avoid that any one ZRO estimate from the "probe" filter dominates the integrated ZRO estimate forever. The "main" filter remembers the total weight for integrating with the measurement from the "probe" filter next time. Such a weight can also be the function of both stable sample count and error tolerance used in the definition of the neighborhood of estimated ZRO for better performance.

Figure 14:
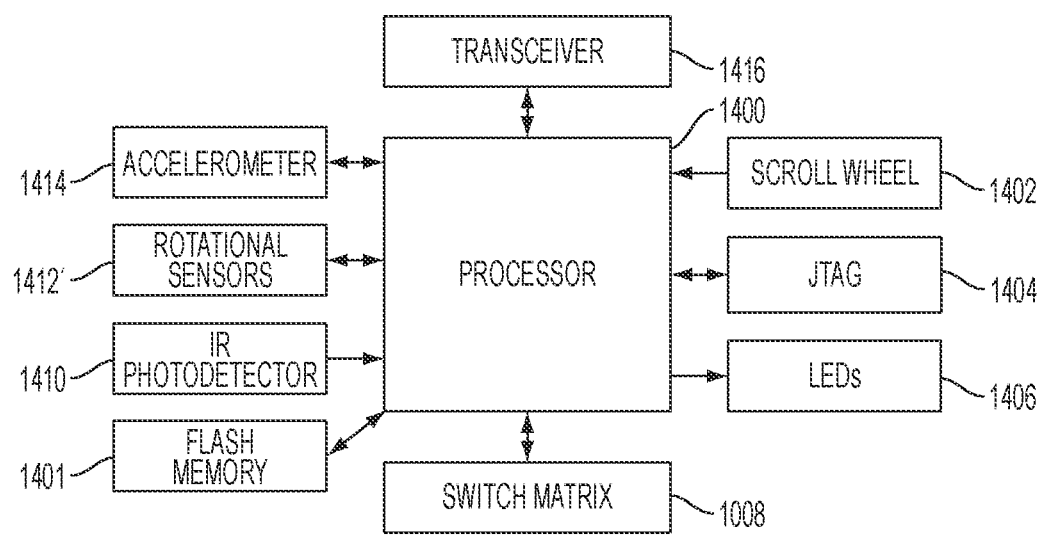
FIG. 14 illustrates a hardware architecture associated with an exemplary device in which the present invention can be implemented.

Having provided a description of bias estimation in exemplary 3D pointing devices according to the afore-described exemplary embodiments, FIG. 14 illustrates an exemplary hardware architecture associated with such 3D pointing devices. Therein, a processor 1400 communicates with other elements of the 3D pointing device including a flash memory 1401, scroll wheel 1402, JTAG 1404, LEDs 1406, switch matrix 1408, IR photodetector 1410, rotational sensor(s) 1412, accelerometer 1414 and transceiver 1416. The flash memory device 1401 can be used by processor 1400 to store various programs and/or data for use in operating the 3D pointing device, e.g., bias estimates as described above. The scroll wheel 1402 is an optional input component which enables a user to provide input to the interface by rotating the scroll wheel 1002 clockwise or counterclockwise. Alternatively, the scroll wheel 1402 can be replaced by an optical finger navigation device (OFN). JTAG 1404 provides the programming and debugging interface to the processor. LEDs 1406 provide visual feedback to a user, for example, when a button is pressed. Switch matrix 1408 receives inputs, e.g., indications that a button on the 3D pointing device has been depressed or released, that are then passed on to processor 1400. The optional IR photodetector 1410 can be provided to enable the exemplary free space pointing device to learn IR codes from other remote controls. Rotational sensor(s) 1412 provide readings to processor 1400 regarding, e.g., the y-axis and z-axis rotation (angular rate) of the 3D pointing device as described above. Accelerometer 1414 provides readings to processor 1400 regarding the linear acceleration of the 3D pointing device which can be used, e.g., to perform tilt compensation and to compensate for errors which linear acceleration introduces into the rotational readings generated by rotational sensor(s) 1412. Transceiver 1416 is used to communicate information to and from 3D pointing device, e.g., to the system controller 228 or to a processor associated with a computer. The transceiver 1416 can be a wireless transceiver, e.g., operating in accordance with the Bluetooth standards for short-range wireless communication or an infrared transceiver. Alternatively, 3D pointing device according to these exemplary embodiments can communicate with systems via a wireline connection.

Various alternatives are contemplated in addition to the exemplary embodiments described above. For example:
  the ZRO tracking/filtering algorithm can be easily adopted to work on any domain including but not limited to sensor raw input domain with only constants conventions;
  the ZRO tracking/filtering algorithm can achieve the same performance without the linear accelerometer's x-axis input;
  the ZRO tracking/filtering algorithm can still work well without any linear accelerometer's input, i.e., the device 700 may omit the accelerometer;
  the ZRO tracking/filtering algorithm can be easily extended to multi-dimensions with or without cross-coupling;

the ZRO tracking/filtering algorithm can be combined with partial or full parts of the method's described in the above-incorporated by reference U.S. Patent Publication 20090033807 to achieve even better performance;

the ZRO tracking/filtering algorithm's buffer can be reused for is-on-table evaluation and yield better converging confidence factor and improve the overall performance;

the ZRO tracking/filtering algorithm's constraints can be derived from any variation of a moving-average filter including but not limited to a cumulative moving-average filter and an exponential moving-average filter;

the ZRO tracking/filtering algorithm's process model can be extended to higher order (n>1) auto-regressive (AR) model and/or ARMA (auto-regressive moving-average) model for better performance;

the inputs to the ZRO tracking/filtering algorithm can be filtered to remove tremor signal if any exists. The filter may be low-pass or band-pass. The filter may by linear-time invariant (LTI), adaptive or model-based;

the ZRO tracking/filtering algorithm can be fed by the ZRO estimate of previous-session run to help initialize the ZRO estimate;

the ZRO tracking/filtering algorithm can even be applied to any initial offset estimate of any kind of sensors including but not limited to angular velocity sensor;

the ZRO tracking/filtering algorithm can be used with other methods for calculating measurement and process error variance;

the ZRO tracking/filtering algorithm can run even more (>2) multi ZRO-tracking filters together in various kinds of combinations to achieve better performance;

the ZRO tracking/filtering algorithm's combined state machine of two ZRO-tracking filters can be even extended beyond when second filter's CCF=2 to improve performance the ZRO measurement error in the exemplary embodiment is based upon peak-to-peak measurement for reduced computation complexity. This error may be computed by any block-based or progressive variance or standard deviation computational method.

Moreover, the exemplary processing described herein may be performed, in whole or in part, either within the 3D pointing device itself or outside of the 3D pointing device. For example, raw sensor data can be transmitted to a system processor, e.g., within a set-top box or a computer, wherein it can then be processed to output a bias estimate and use that bias estimate as part of the larger processing scheme to determine motion of the 3D pointing device and use such information, e.g., to update cursor position associated with a cursor displayed on a user interface screen. The bias estimate described herein can, for example, be subtracted from an initial measurement of angular rate by the rotational sensor(s) 702, e.g., after a static calibration as a function of temperature has been performed.

The exemplary embodiments described herein also provide a number of advantages and benefits, including, for example, one or more of those described in this paragraph. Given a time-varying input signal with a significant initial ZRO, the method removes the undesired ZRO in a much quicker fashion while producing the desired time-varying motion signal. This new method continues to function well even if the initial ZRO is beyond 50 degree/s and during motion. The new method also consumes much fewer resources (processor processing time and memory usage). Another advantage is that this exemplary embodiment can tolerate more sensor calibration error. This exemplary embodiment can even work in any domain including un-calibrated domain which can be sensor raw input domain (ADC or milliVolt).

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within the device, e.g., a 3D pointing device or other device, which contains the sensors or the software may run on a processor or computer housed within another device, e.g., a system controller, a game console, a personal computer, etc., which is in communication with the device containing the sensors. In such a case, data may be transferred via wireline or wirelessly between the device containing the sensors and the device containing the processor which runs the software which performs the bias estimation and compensation as described above. According to other exemplary embodiments, some of the processing described above with respect to bias estimation may be performed in the device containing the sensors, while the remainder of the processing is performed in a second device after receipt of the partially processed data from the device containing the sensors.

Although the foregoing exemplary embodiments relate to sensing packages including one or more rotational sensors and an accelerometer, bias estimation techniques according to these exemplary embodiments are not limited to only these types of sensors. Instead bias estimation techniques as described herein can be applied to devices which include, for example, only accelerometer(s), optical and inertial sensors (e.g., a rotational sensor, a gyroscope or an accelerometer), a magnetometer and an inertial sensor (e.g., a rotational sensor, a gyroscope or an accelerometer), a magnetometer and an optical sensor (e.g. a camera, one or more photodiodes, one or more phototransistors), or other sensor combinations. Additionally, although exemplary embodiments described herein relate to bias estimation in the context of 3D pointing devices and applications, such techniques are not so limited and may be employed in methods and devices associated with other applications, e.g., mobile phones, medical applications, gaming, cameras, military applications, etc. The ZRO tracking filtering algorithm can be extended to account for sensor nonlinearities by replacing the Kalman Filter with an Extended Kalman Filter, Unscented Kalman filter, Particle Filter or any other standard nonlinear state estimation technique.

The above-described exemplary embodiments are intended to be illustrative in all respects, rather than restrictive, of the present invention. Thus the present invention is capable of many variations in detailed implementation that can be derived from the description contained herein by a person skilled in the art. For example, although the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A device comprising:
   at least one sensor configured to sense rotation of said device about at least one axis and to generate at least one output associated therewith; and
   a zero-rate output (ZRO) tracking filter configured to receive said at least one output and to compensate said at least one output for a bias associated with said at least one sensor,
   wherein said ZRO filter is implemented as a Kalman filter having at least one constraint enforced on at least one parameter associated therewith,
   further wherein said at least one constraint is selected based on whether said ZRO filter has converged on an estimate of said bias, such that a first constraint is applied before said ZRO filter has converged on said estimate of said bias and that a second constraint, different from said first constraint, is applied after said ZRO filter has converged on said estimate of said bias,
   wherein said first constraint ensures a minimum convergence speed by using a minimum Kalman gain before convergence ($K_1$) and said second constraint, different from said first constraint, limits a convergence speed by using a maximum Kalman gain after convergence ($K_2$), and
   wherein $K_1$ and $K_2$ are calculated to determine a total Kalman gain.

2. The device of claim 1, wherein said sensed rotation of said device involves at least one of: an angular velocity, an angular rate, and an angular position of said device.

3. The device of claim 1, wherein said bias is associated with a non-zero value output from said at least one sensor when said device is stationary.

4. The device of claim 1, wherein said at least one constraint is a lower bound enforced on an error variance (P) of an estimate of said bias.

5. The device of claim 1, wherein said at least one constraint is an upper bound enforced on an error variance (P) of an estimate of said bias.

6. The device of claim 1, wherein said at least one constraint is a lower bound enforced on a gain of said Kalman filter.

7. The device of claim 6, wherein said lower bound is enforced using at least one moving average.

8. The device of claim 7, wherein said at least one moving average is a cumulative moving average during a first number of samples of said at least one first output, and is an exponential moving average after said first number of samples.

9. The device of claim 1, wherein said at least one constraint is an upper bound enforced on a gain of said Kalman filter.

10. The device of claim 1, wherein said at least one constraint includes both an upper bound and a lower bound on an error variance (P) of an estimate of said bias and an upper bound and a lower bound on a gain of said Kalman filter.

11. The device of claim 1, wherein said convergence on said estimate of said bias is determined based on a convergence confidence factor of said ZRO filter.

12. The device of claim 1, wherein said at least one sensor includes a gyroscope.

13. A device comprising:
    at least one sensor configured to sense rotation of said device about at least one axis and to generate at least one output associated therewith; and
    a zero rate output (ZRO) filter configured to receive said at least one output and to compensate said at least one output for a bias associated with said at least one sensor,
    wherein said ZRO filter is implemented as a combination of a Kalman filter and a moving-average filter,
    wherein said Kalman filter has at least one constraint enforced on at least one parameter associated therewith,
    further wherein said at least one constraint is selected based on whether said Kalman filter has converged on an estimate of said bias, such that a first constraint is applied before said Kalman filter has converged on said estimate of said bias and that a second constraint, different from said first constraint, is applied after said Kalman filter has converged on said estimate of said bias,
    wherein said first constraint ensures a minimum convergence speed by using a minimum Kalman gain before convergence ($K_1$) and said second constraint, different from said first constraint, limits a convergence speed by using a maximum Kalman gain after convergence ($K_2$), and
    wherein $K_1$ and $K_2$ are calculated to determine a total Kalman gain.

14. The device of claim 13, wherein said moving average filter is a cumulative moving average filter during a first number of samples of said at least one first output, and is an exponential moving average filter after said first number of samples.

15. The device of claim 13, wherein said ZRO filter switches its computation method for a coefficient from a first technique prior to convergence on a bias estimate to a second technique after convergence on said bias estimate.

16. The device of claim 13, wherein said ZRO filter evaluates whether a current estimate of said bias has converged to a true value of said bias.

17. The device of claim 13, wherein said ZRO filter computes measurement variance for a phase "before convergence" of an estimate of said bias using a technique which does not directly count a DC portion of said at least one first output.

18. The device of claim 13, further comprising:
    a plurality of instances of said ZRO filters running together with at least one of different conditions and initializations to generate both a quick convergence to said bias and less likelihood of false convergence to said bias.

19. The device of claim 13, wherein said ZRO filter enforces different bounds on prediction variation before convergence to a bias estimate and after convergence to a bias estimate to reduce backlash pickup.

20. The device of claim 13, wherein said at least one sensor includes a gyroscope.

21. A method for filtering an output of a sensor to compensate for bias error, the method comprising:
    filtering said output of said sensor using a shared recursive computation architecture of a standard Kalman filter, a cumulative moving-average filter, and an exponential moving-average filter, wherein a filter gain is adaptively modified as a function of Kalman gain, a cumulative moving-average coefficient, and an exponential moving-average coefficient.

22. The method of claim 21, further comprising:
    enforcing constraints on a predicted estimate covariance used in a Kalman gain computation.

23. The method of claim 21, wherein said function is a first function before convergence of a bias estimate and a second function, different from said first function, after convergence of said bias estimate.

24. The method of claim 22, wherein said constraints include a first set of constraints used before convergence to a bias estimate and a second set of constraints, different than said first set of constraints, after convergence to said bias estimate.

* * * * *